(12) United States Patent  
Ajaykumar et al.

(10) Patent No.: US 11,977,672 B2
(45) Date of Patent: May 7, 2024

(54) DISTRIBUTED POSE PREDICTION

(71) Applicant: QUALCOMM Incorporated, San Diego, CA (US)

(72) Inventors: Sriram Ajaykumar, Bangalore (IN); Vinay Melkote Krishnaprasad, Bangalore (IN); Arjun Sitaram, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/832,292

(22) Filed: Jun. 3, 2022

(65) Prior Publication Data

US 2023/0393650 A1 Dec. 7, 2023

(51) Int. Cl.
*G06F 3/01* (2006.01)
*G06F 3/0346* (2013.01)

(52) U.S. Cl.
CPC ............ *G06F 3/012* (2013.01); *G06F 3/0346* (2013.01)

(58) Field of Classification Search
CPC ................................ G06F 3/012; G06F 3/0346
See application file for complete search history.

(56) References Cited

U.S. PATENT DOCUMENTS

| | | | | | |
|---|---|---|---|---|---|
| 6,127,990 | A | * | 10/2000 | Zwern | G09B 9/00 345/158 |
| 9,268,136 | B1 | * | 2/2016 | Starner | G06F 3/03547 |
| 10,802,287 | B2 | * | 10/2020 | Selan | G09G 5/12 |
| 10,908,680 | B1 | * | 2/2021 | Woods | G06T 19/006 |
| 10,976,804 | B1 | * | 4/2021 | Atlas | G06F 3/017 |
| 11,023,035 | B1 | * | 6/2021 | Atlas | G06F 3/014 |
| 11,144,117 | B1 | * | 10/2021 | Choudhuri | G06N 20/00 |
| 11,321,920 | B2 | * | 5/2022 | Iwase | G06T 19/003 |
| 11,449,189 | B1 | * | 9/2022 | Bond | G06F 3/0482 |
| 2011/0249122 | A1 | * | 10/2011 | Tricoukes | G06F 1/163 348/158 |

(Continued)

FOREIGN PATENT DOCUMENTS

EP 3800528 A1 4/2021

OTHER PUBLICATIONS

International Search Report and Written Opinion—PCT/US2023/067366—ISA/EPO—dated Aug. 18, 2023.

*Primary Examiner* — Benyam Ketema
(74) *Attorney, Agent, or Firm* — QUALCOMM Incorporated

(57) ABSTRACT

Systems and techniques are described herein for generating and/or processing virtual content in a distributed system (e.g., a distributed extended reality system). For example, a first device (e.g., a client device) of a distributed extended reality system may transmit one or more sets of pose prediction parameters (e.g., prediction coefficients, prediction time associated with raw pose data, and/or the raw pose data) to a second device (e.g., a server device) of the distributed extended reality system. The second device may predict one or more poses of the second device based on the set(s) of pose prediction parameters, and may generate virtual content based on a pose of the predicted pose(s) of the first device. The second may transmit and the first device may receive the virtual content. The first device may then display one or more virtual objects based at least in part on the received virtual content.

30 Claims, 14 Drawing Sheets

(56) References Cited

U.S. PATENT DOCUMENTS

| | | | | |
|---|---|---|---|---|
| 2013/0083009 | A1* | 4/2013 | Geisner | A63F 13/52 |
| | | | | 345/419 |
| 2015/0220152 | A1* | 8/2015 | Tait | G06F 3/017 |
| | | | | 345/156 |
| 2015/0302665 | A1* | 10/2015 | Miller | G06F 3/016 |
| | | | | 345/419 |
| 2018/0365853 | A1* | 12/2018 | Yang | G06T 7/75 |
| 2019/0094981 | A1* | 3/2019 | Bradski | H04N 21/414 |
| 2019/0197196 | A1* | 6/2019 | Yang | G06F 30/00 |
| 2020/0225473 | A1* | 7/2020 | Selan | G02B 27/0172 |
| 2020/0364901 | A1* | 11/2020 | Choudhuri | G06T 19/006 |
| 2021/0090333 | A1* | 3/2021 | Ravasz | G02B 27/01 |
| 2021/0099756 | A1* | 4/2021 | Gnanapragasam | G06V 20/41 |
| 2021/0118157 | A1* | 4/2021 | LeGendre | G06T 11/001 |
| 2021/0124412 | A1* | 4/2021 | Johnson | G06F 3/0346 |
| 2021/0134007 | A1* | 5/2021 | Ahmed | G06V 20/00 |
| 2021/0192681 | A1* | 6/2021 | Mironov | G06T 3/0056 |
| 2021/0240258 | A1* | 8/2021 | Son | G02B 27/017 |
| 2022/0155853 | A1* | 5/2022 | Fan | G06F 3/0483 |
| 2022/0308342 | A1* | 9/2022 | Gullicksen | G01S 11/026 |
| 2023/0064242 | A1* | 3/2023 | Kim | G06T 7/277 |

\* cited by examiner

DISTRIBUTED POSE PREDICTION

TECHNICAL FIELD

The present disclosure generally relates to pose estimation technologies. For example, aspects of the present disclosure include systems and techniques for providing distributed pose prediction.

BACKGROUND

Pose estimation can be used in various applications, such as in extended reality (XR) (e.g., virtual reality, augmented reality, mixed reality), computer vision, and robotics, to determine the position and orientation of a human or object relative to a scene or environment. The pose information can be used to manage interactions between a human or object and a specific scene or environment. For example, the pose of a user or a device worn by the user can be used to enhance or augment the user's real or physical environment with virtual content. As another example, the pose (e.g., position and orientation) of a robot can be used to allow the robot to manipulate an object or avoid colliding with an object when moving about a scene.

As noted above, pose estimation may be used in XR systems, such as smart glasses and head-mounted displays (HMDs). Such extended reality systems generally implement cameras and sensors to track the position of the XR device and other objects within the physical environment. The XR devices can use such tracking information to provide a user of the XR device a realistic XR experience. For example, an XR device can allow a user to experience or interact with immersive virtual environments or content. To provide realistic XR experiences, XR technologies can integrate virtual content with the physical world or a video feed depicting a scene in the physical world. In some cases, XR technologies can match the relative pose and movement of objects and devices in the physical world. For example, an XR device can use tracking information to calculate the relative pose of the XR system or device in addition to poses of devices, objects, and/or features of the real-world environment in order to match the relative position and movement of the devices, objects, and/or the real-world environment. In some cases, the XR device can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment.

However, the computational complexity of pose estimation systems can impose significant power and resource demands, and can be a limiting factor in various applications. The computational complexity of pose estimation can also limit the performance and scalability of tracking and localization applications that rely on pose information.

SUMMARY

Systems and techniques are described for providing distributed (e.g., server-based) pose prediction (e.g., in extended reality (XR) systems). According to at least one example, a method is provided for generating virtual content at a first device in a distributed extended reality system. The method includes: receiving, from a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; predicting one or more poses of the second device based on the one or more sets of pose prediction parameters; generating virtual content based on a pose of the predicted one or more poses of the first device; and transmitting the virtual content to the second device.

In another example, a first device for generating virtual content in a distributed extended reality system is provided that includes at least one memory and at least one processor (e.g., configured in circuitry) coupled to the at least one memory. The at least one processor is configured to: receive, from a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; predict one or more poses of the second device based on the one or more sets of pose prediction parameters; generate virtual content based on a pose of the predicted one or more poses of the first device; and transmit the virtual content to the second device.

In another example, a non-transitory computer-readable medium is provided that has stored thereon instructions that, when executed by one or more processors, cause the one or more processors to: receive, from a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; predict one or more poses of the second device based on the one or more sets of pose prediction parameters; generate virtual content based on a pose of the predicted one or more poses of the first device; and transmit the virtual content to the second device.

In another example, a first device for generating virtual content in a distributed extended reality system is provided. The apparatus includes: means for receiving, from a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; means for predicting one or more poses of the second device based on the one or more sets of pose prediction parameters; means for generating virtual content based on a pose of the predicted one or more poses of the first device; and means for transmitting the virtual content to the second device.

According to at least one additional example, a method is provided for processing virtual content at a first device in a distributed extended reality system. The method includes: transmitting, to a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; receiving, from the second device, virtual content based on a pose of one or more predicted poses of the first device, the one or more predicted poses being predicted based on the one or more sets of pose prediction parameters transmitted to the second device; and displaying one or more virtual objects based at least in part on the received virtual content.

In another example, a first device for processing virtual content in a distributed extended reality system is provided that includes at least one memory and at least one processor (e.g., configured in circuitry) coupled to the at least one memory. The at least one processor is configured to: transmit, to a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; receive, from the second device, virtual content based on a pose of one or more predicted poses of the first device, the one or more predicted poses being predicted based on the one or more sets of pose prediction parameters transmitted to the second device; and display one or more virtual objects based at least in part on the received virtual content.

In another example, a non-transitory computer-readable medium is provided that has stored thereon instructions that, when executed by one or more processors, cause the one or more processors to: transmit, to a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; receive, from the second device, virtual content based on a pose of one or more predicted poses of the first device, the one or more predicted poses being predicted based on the one or more sets of pose prediction parameters transmitted to the second device; and display one or more virtual objects based at least in part on the received virtual content.

In another example, a first device for processing virtual content in a distributed extended reality system is provided. The apparatus includes: means for transmitting, to a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; means for receiving, from the second device, virtual content based on a pose of one or more predicted poses of the first device, the one or more predicted poses being predicted based on the one or more sets of pose prediction parameters transmitted to the second device; and means for displaying one or more virtual objects based at least in part on the received virtual content.

In some aspects, one or more of the apparatuses described herein is, is part of, and/or includes an extended reality (XR) device (e.g., a virtual reality (VR) device, an augmented reality (AR) device, or a mixed reality (MR) device), a mobile device (e.g., a mobile telephone or other mobile device), a wearable device, a head-mounted device (HMD) device, a wireless communication device, a camera, a personal computer, a laptop computer, a server computer or server device (e.g., an edge or cloud-based server, a personal computer acting as a server device, a mobile device such as a mobile phone acting as a server device, an XR device acting as a server device, a network router, or other device acting as a server), a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
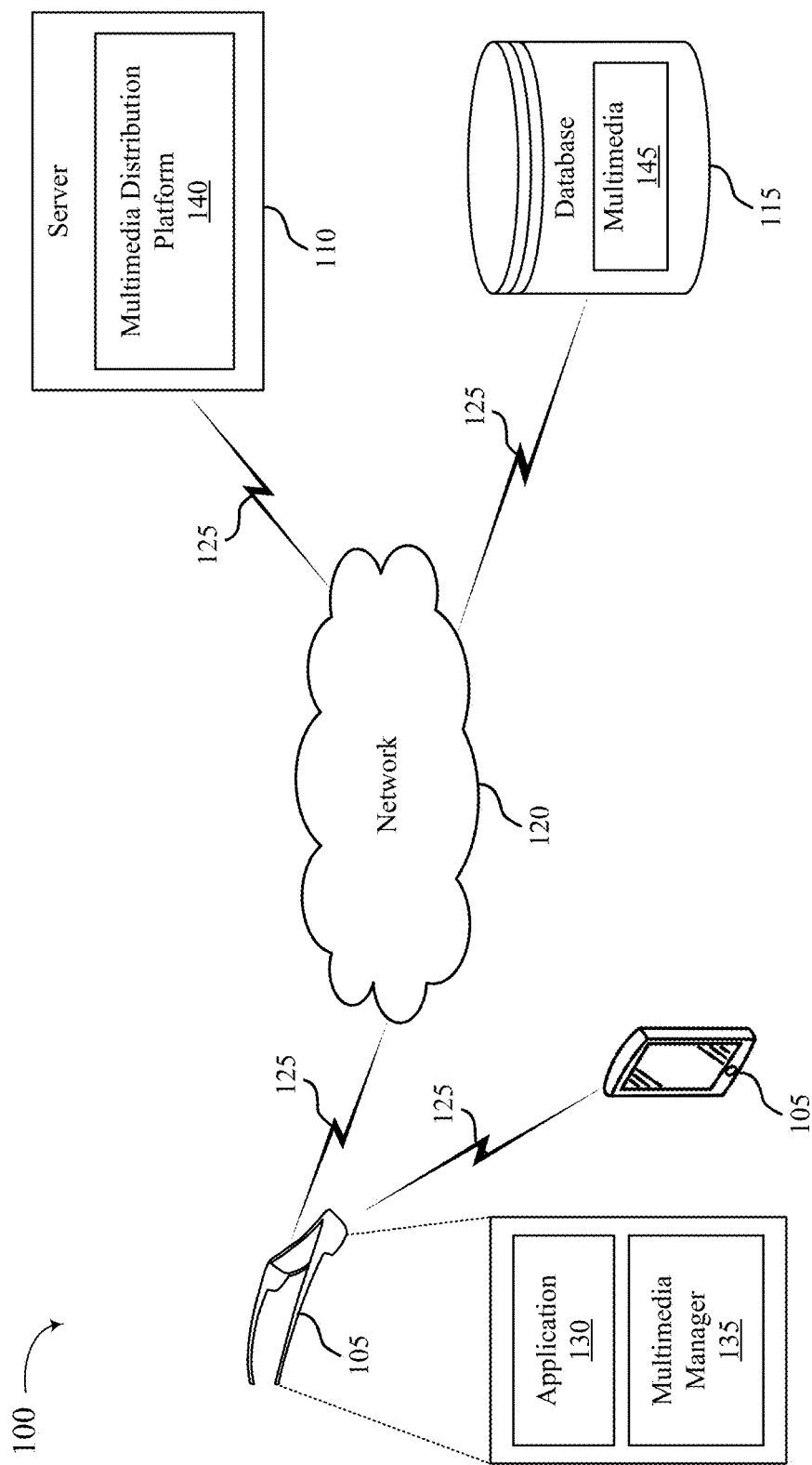
FIG. 1 is a diagram illustrating an example of a distributed extended reality (XR) system, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. As used herein, the terms XR system and XR device are used interchangeably. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include any virtual content, such as video, images, graphic content, location data (e.g., global positioning system (GPS) data or other location data), sounds, any combination thereof, and/or other augmented content. An AR system is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

VR provides a complete immersive experience in a three-dimensional computer-generated VR environment or video depicting a virtual version of a real-world environment. The VR environment can be interacted with in a seemingly real or physical way. As a user experiencing a VR environment moves in the real world, images rendered in the virtual environment also change, giving the user the perception that the user is moving within the VR environment. For example, a user can turn left or right, look up or down, and/or move forwards or backwards, thus changing the user's point of view of the VR environment. The VR content presented to the user can change accordingly, so that the user's experience is as seamless as in the real world. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

MR technologies can combine aspects of VR and AR to provide an immersive experience for a user. For example, in an MR environment, real-world and computer-generated objects can interact (e.g., a real person can interact with a virtual person as if the virtual person were a real person).

In some cases, XR systems or devices can match the relative pose and movement of objects and devices in the physical world. For example, an XR device can use tracking information to calculate the relative pose of devices, objects, and/or features of the real-world environment in order to match the relative position and movement of the devices, objects, and/or the real-world environment. In some cases, the XR device can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment.

As previously mentioned, the computational complexity of pose estimation systems can impose significant power and resource demands, and can be a limiting factor in various applications. The computational complexity of pose estimation can also limit the performance and scalability of tracking and localization applications that rely on pose information. For example, the computational complexity of pose estimation can impose large power and resource demands on devices when implementing XR applications. Such power and resource demands are exacerbated by recent trends towards implementing such technologies in mobile and wearable devices, and making such devices smaller, lighter and more comfortable (e.g., by reducing the heat emitted by the device) to wear by the user for longer periods of time.

In some cases, a distributed XR system (which can also be referred to herein as a split XR system) can be used to reduce the computational complexity of a client device by dividing or splitting the XR processing burden between a first device or system (e.g., including a client device such as an XR headset, HMD, etc.) and a second device or system (e.g., including one or more server devices). In a distributed XR system, the first device (e.g., a client device) may transmit pose information representing a pose of the client device (e.g., HMD pose data) to the second device (e.g., a server device). The pose information may include orientation information (e.g., pitch, roll, and yaw) and/or translation information (e.g., horizontal displacement, vertical displacement, and depth displacement). The second device (e.g., the server device) can render virtual content (e.g., XR content) at a particular render call based on the pose information of the first device (e.g., the client device). The second device (e.g., the server device) can then compress and transmit the virtual content to the first device (e.g., the client device) along with render pose information defining the pose at which the content was rendered (referred to as the render pose). The first device (e.g., the client device) may decompress and render the virtual content after warping the virtual content using the render pose and latest pose information of the first device (e.g., the client device).

The data path of transmitting the pose information from the first device (e.g., the client device) to the second device (e.g., the server device) and receiving the virtual content and render pose at the first device from the second device is referred to as a round trip. There is round-trip latency in the round trip, referring to the latency between when the pose is determined by the first device to when the rendered virtual content is received at the first device. Because of the round-trip latency, the first device may predict a pose into the future by approximating the round-trip time. By predicting a pose into the future, the first device can ensure the difference or delta between render and display poses are small. If the delta is large, then there may be warping artifacts that occur in the displayed virtual content.

Network interference may occur when transmitting the pose information from the first device (e.g., the client device) to the second device (e.g., the server device), which may be due to overlapping channels in different wireless networks. For example, a distributed XR system in a first network may experience low interference from a second if the signal strength of the second network is low in an area of an environment in which the distributed XR system is located, while it may experience heavy interference from a third network if the signal strength of the third network is high in the area of the environment. When there is heavy interference, the pose information may not be received on the second device at a fixed cadence or interval of time (e.g., the pose information is received sporadically across time).

If poses do not arrive before a render call at which point the second device (e.g., the server device) renders virtual content, the second device may need to select an old or stale pose to render the virtual content. When the first device (e.g., the client device) displays virtual content that is generated by a server device using a stale pose, the virtual content is perceived visually as translational judder which deteriorates the user experience. In some cases, approximately 5-15% of the rendered virtual content frames are generated using stale poses under heavy interference channel conditions.

Systems, apparatuses, electronic devices, methods (also referred to as processes), and computer-readable media (collectively referred to herein as "systems and techniques") are described herein for providing distributed pose prediction (e.g., in extended reality (XR) systems). In some aspects, a first device (e.g., a client device, such as an XR device including an HMD or other type of XR device) may transmit pose prediction parameters to a second device (e.g., a device acting as a server device, such as a cloud or edge-based server, a personal computer acting as a server, another XR device acting as a server, etc.). While the first device will be referred to herein as a client device and the second device will be described herein as a server device, the systems and techniques described herein can be implemented by any devices in a distributed system (e.g., a distributed XR system).

A set of pose prediction parameters may include raw pose data, prediction coefficients associated with the raw pose data, and a prediction time associated with a time at which the raw pose data is obtained. The raw pose data may be obtained by the client device using one or more sensors (e.g., samples from an inertial measurement unit (IMU)) or a tracking system (e.g., a 6 degrees-of-freedom (6 DOF) tracker) that obtains sensor data from the one or more sensors. In some cases, the raw pose data includes a pitch, a roll, a yaw, and translation data (e.g., a horizontal displacement, a vertical displacement, and depth displacement relative to a reference point) representing the pose of the client device. In some examples, the coefficients may be used in a polynomial to predict a pose of the client device. For instance, the coefficients may be bias corrected IMU coefficients.

In some aspects, the server device may use a set of pose prediction parameters (e.g., raw pose data, prediction coefficients, and a prediction time) to predict or extrapolate poses at a fixed time interval or cadence. In such aspects, even if arrival of the pose parameters at the server device is intermittent, a rendering engine on the server device that renders the virtual content will continue to observe uniformly spaced pose samples. In some cases, the server device may use the set of pose prediction parameters (e.g., raw pose, prediction coefficients, and prediction time) to predict or extrapolate poses upon determining that virtual content is to be generated (e.g., in response to receiving a pose request from a rendering engine, such as at a render call). In such aspects, the server device may use a set of pose prediction parameters (e.g., raw pose data, prediction coefficients, and a prediction time) to generate poses just before a render call. For instance, a rendering engine can request a pose from a pose extrapolation engine. Based on a latest set of prediction parameters (e.g., raw pose data, prediction coefficients, and a prediction time), the pose extrapolation engine can predict or extrapolate a pose and output the predicted pose to the rendering engine.

The client device has access to finely sampled sensor (e.g., IMU) values, so the client can generate accurate coefficients which is important for high quality pose prediction. By sending the client-generated coefficients to the server device, the system can ensure high accuracy of pose extrapolation. Such systems and techniques for predicting or extrapolating poses at a server device is more accurate than extrapolating poses based on predicting poses based on actual predicted poses received on the server device. By predicting or extrapolating poses on the server device based on the pose prediction data (e.g., raw pose data, prediction coefficients, and a prediction time), visual artifacts (e.g., translational judder) will be eliminated or reduced and the experience of a user of the client device will be enhanced based on fewer or no stale poses being used to render frames. Furthermore, reduction in end-to-end latency may be achieved, as poses can be extrapolated just before a render call. Poses may also be transmitted at a lower rate, which reduces contention for channel access.

In some aspects, the server device and the client device (e.g., in a distributed XR system) have access to a shared clock. For example, in a phone-to-XR device (also referred to as phone-to-glass) distributed system where the server device is the phone and is connected wirelessly to the XR device, an underlying communications layer (e.g., a WiFi layer) may provide a clock functionality commonly to both devices with which it is providing a wireless connection. In such an example, one or more updates to the prediction time at the server end (e.g., in cases where the coefficients do not arrive in time) may be performed according to the common clock. In one example, if the server device is configured to generate a pose sample every 2 milliseconds (ms), without a common clock the server device would generate the pose every 2 ms in the server clock. With a common clock, the server device can generate pose samples every 2 ms on the client device clock if needed. Such an example can be used to address synchronization issues between pose generation events on the server side and prediction coefficient generation events on the client side.

In some cases, in a distributed XR system, rendered frames may arrive irregularly at the client device from the server device, such as depending on rendering complexity and network jitter. However, the display of the client device may operate or run at a fixed frame rate. As such, in some aspects (e.g., where a common clock is available between the server device and the client device), the server device may more accurately predict, at the time of rendering a virtual frame, which vsync opportunity (display tick) that rendered frame will be displayed at and a future point in time in which the clock tick will occur. Based on such a determination, the server device may determine the prediction time and use the determined prediction time in conjunction with the pose prediction coefficients get a predicted pose.

Various aspects of the application will be described with respect to the figures.

FIG. 1 is a diagram illustrating an example of a system 100 in accordance with aspects of the present disclosure. The system 100 may represent a distributed extended reality (XR) system. The system 100 may include devices 105, a server 110 (also referred to as a server device), and storage 115. Although the system 100 illustrates two devices 105, a single server 110, a single storage 115, and a single network 120, the present disclosure applies to any system architecture having one or more devices 105, servers 110, storage devices 115, and networks 120. In some cases, the storage 115 may be part of the server 110. The devices 105, the server 110, and the storage 115 may communicate with each other and exchange information that supports server-based based pose prediction for XR, such as multimedia packets, multimedia data, multimedia control information, pose prediction parameters (e.g., raw pose data, prediction coefficients, and a corresponding prediction time), via network 120 using communications links 125. In some cases, a portion of the techniques described herein for providing server-based pose prediction for XR may be performed by one or more of the devices 105 and a portion of the techniques may be performed by the server 110, or both.

A device 105 may be an XR device (e.g., a head-mounted display (HMD), XR glasses such as virtual reality (VR) glasses, augmented reality (AR) glasses, etc.), a mobile device (e.g., a cellular phone, a smartphone, a personal digital assistant (PDA), etc.), a wireless communication device, a tablet computer, a laptop computer, and/or other device that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol, such as using sidelink communications). For example, a device 105 may be able to receive from or transmit to another device 105 variety of information, such as instructions or commands (e.g., multimedia-related information).

The devices 105 may include an application 130 and a multimedia manager 135. While the system 100 illustrates the devices 105 including both the application 130 and the multimedia manager 135, the application 130 and the multimedia manager 135 may be an optional feature for the devices 105. In some cases, the application 130 may be a multimedia-based application that can receive (e.g., download, stream, broadcast) from the server 110, storage 115 or another device 105, or transmit (e.g., upload) multimedia data to the server 110, the storage 115, or to another device 105 via using communications links 125.

The multimedia manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the multimedia manager 135 may process multimedia (e.g., image data, video data, audio data) from and/or write multimedia data to a local memory of the device 105 or to the storage 115.

The multimedia manager 135 may also be configured to provide multimedia enhancements, multimedia restoration, multimedia analysis, multimedia compression, multimedia streaming, and multimedia synthesis, among other functionality. For example, the multimedia manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 135 may process multimedia data to support server-based pose prediction for XR, according to the techniques described herein.

The server 110 may be a data server, a cloud server, a server associated with a multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The storage 115 may store a variety of information, such as instructions or commands (e.g., multimedia-related information). For example, the storage 115 may store multimedia 145. The device may support server-based pose prediction for XR associated with the multimedia 145. The device 105 may retrieve the stored data from the storage 115 via the network 120 using communication links 125. In some examples, the storage 115 may be a memory device (e.g., read only memory (ROM), random access memory (RAM), cache memory, buffer memory, etc.), a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information). The storage 115 may store a reference model (e.g., a machine learning model, a simulation model, etc.), and in some cases, the machine learning model may be updated based on user input received from a device 105.

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the system 100 may include uplink transmissions from the device 105 to the server 110 and the storage 115, and/or downlink transmissions, from the server 110 and the storage 115 to the device 105. The wireless links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

In some examples, a device 105 or a server 110 may process information (e.g., from storage 115) via machine learning techniques (e.g., using one or more machine learning models, such as one or more neural networks). For example, the device 105 may be configured to use machine learning to determine one or more pose prediction parameters (e.g., prediction coefficients). In some cases, the server 110 may process pose prediction parameters (e.g., raw pose data, prediction coefficients, and a corresponding prediction time) received from the client device 105 to predict a current and/or future pose of the device 105 (e.g., corresponding to a head pose of a user of the device 105). In some cases, the data from the storage 115 may include information from other users (e.g., head pose patterns of other users experiencing similar XR applications). Examples of the machine learning techniques may include linear regression, logistic regression, decision tree, support vector machine (SVM), naive Bayes, k-nearest neighbor, random forest, dimensionality reduction algorithms, gradient boosting algorithms, or any combination thereof.

Figure 2:
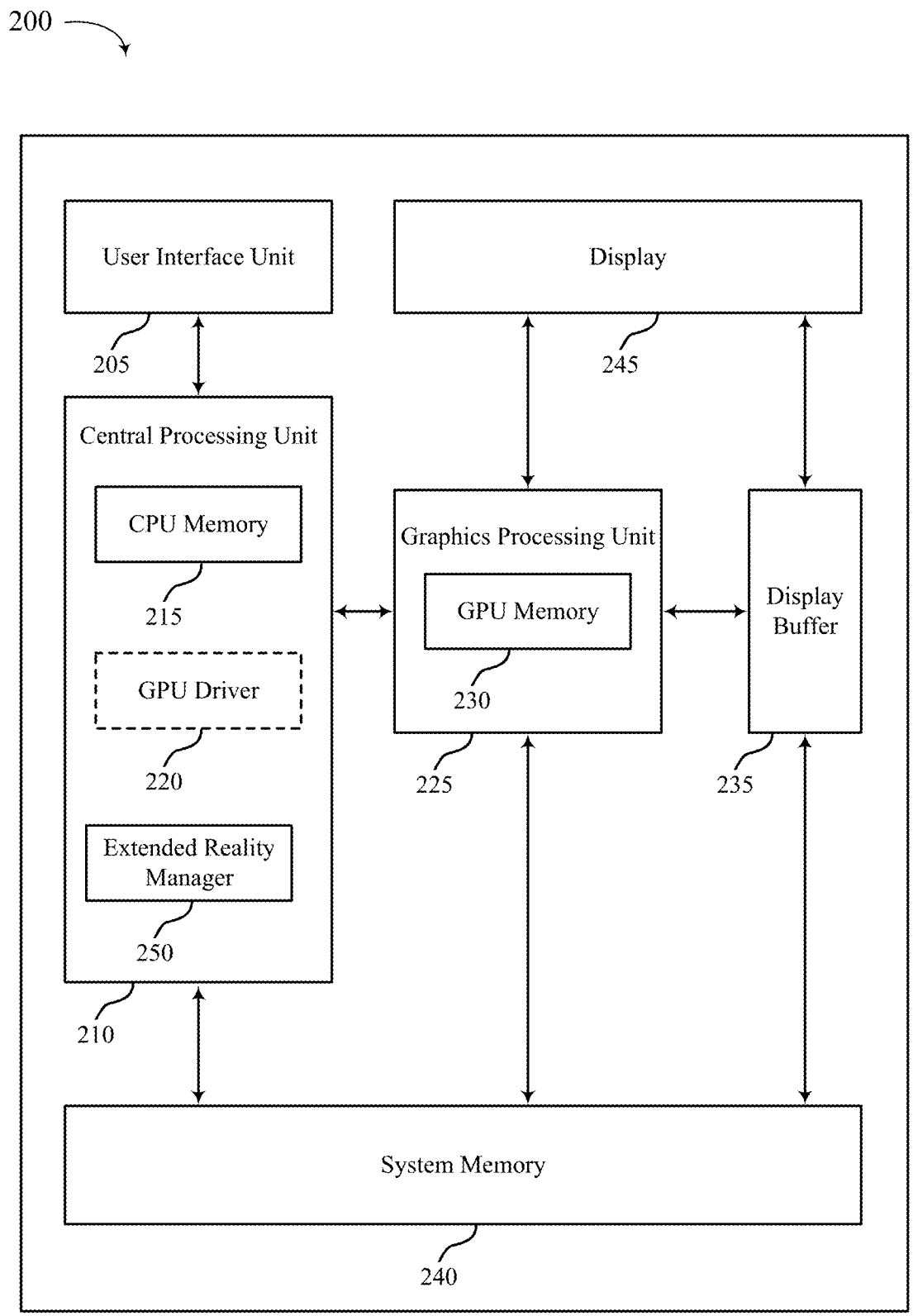
FIG. 2 is a diagram illustrating an example of a device, according to aspects of the disclosure.

FIG. 2 is a diagram illustrating an example of a device 200. The device 200 is an example of a client device (e.g., device 105 of FIG. 1) or a server device (e.g., server 110 of FIG. 1). As shown, the device 200 includes a central processing unit (CPU) 210 having CPU memory 215, a GPU 225 having GPU memory 230, a display 245, a display buffer 235 storing data associated with rendering, a user interface unit 205, and a system memory 240. For example, system memory 240 may store a GPU driver 220 (illustrated as being contained within CPU 210 as described below) having a compiler, a GPU program, a locally-compiled GPU program, and the like. User interface unit 205, CPU 210, GPU 225, system memory 240, display 245, and extended reality manager 250 may communicate with each other (e.g., using a system bus).

Examples of CPU 210 include, but are not limited to, a digital signal processor (DSP), general purpose microprocessor, application specific integrated circuit (ASIC), field programmable logic array (FPGA), or other equivalent integrated or discrete logic circuitry. Although CPU 210 and GPU 225 are illustrated as separate units in the example of FIG. 2, in some examples, CPU 210 and GPU 225 may be integrated into a single unit. CPU 210 may execute one or more software applications. Examples of the applications may include operating systems, word processors, web browsers, e-mail applications, spreadsheets, video games, audio and/or video capture, playback or editing applications, or other such applications that initiate the generation of image data to be presented via display 245. As illustrated, CPU 210 may include CPU memory 215. For example, CPU memory 215 may represent on-chip storage or memory used in executing machine or object code. CPU memory 215 may include one or more volatile or non-volatile memories or storage devices, such as flash memory, a magnetic data media, an optical storage media, etc. CPU 210 may be able to read values from or write values to CPU memory 215 more quickly than reading values from or writing values to system memory 240, which may be accessed, e.g., over a system bus.

GPU 225 may represent one or more dedicated processors for performing graphical operations. That is, for example, GPU 225 may be a dedicated hardware unit having fixed function and programmable components for rendering graphics and executing GPU applications. GPU 225 may also include a DSP, a general purpose microprocessor, an ASIC, an FPGA, or other equivalent integrated or discrete logic circuitry. GPU 225 may be built with a highly-parallel structure that provides more efficient processing of complex graphic-related operations than CPU 210. For example, GPU 225 may include a plurality of processing elements that are configured to operate on multiple vertices or pixels in a parallel manner. The highly parallel nature of GPU 225 may allow GPU 225 to generate graphic images (e.g., graphical user interfaces and two-dimensional or three-dimensional graphics scenes) for display 245 more quickly than CPU 210.

GPU 225 may, in some instances, be integrated into a motherboard of device 200. In other instances, GPU 225 may be present on a graphics card that is installed in a port in the motherboard of device 200 or may be otherwise incorporated within a peripheral device configured to interoperate with device 200. As illustrated, GPU 225 may include GPU memory 230. For example, GPU memory 230 may represent on-chip storage or memory used in executing machine or object code. GPU memory 230 may include one or more volatile or non-volatile memories or storage devices, such as flash memory, a magnetic data media, an optical storage media, etc. GPU 225 may be able to read values from or write values to GPU memory 230 more quickly than reading values from or writing values to system memory 240, which may be accessed, e.g., over a system bus. That is, GPU 225 may read data from and write data to GPU memory 230 without using the system bus to access off-chip memory. This operation may allow GPU 225 to operate in a more efficient manner by reducing the need for GPU 225 to read and write data via the system bus, which may experience heavy bus traffic.

Display 245 represents a unit capable of displaying video, images, text or any other type of data for consumption by a viewer. Display 245 may include a liquid-crystal display (LCD), a light emitting diode (LED) display, an organic LED (OLED), an active-matrix OLED (AMOLED), or the like. Display buffer 235 represents a memory or storage device dedicated to storing data for presentation of imagery, such as computer-generated graphics, still images, video frames, or the like for display 245. Display buffer 235 may represent a two-dimensional buffer that includes a plurality of storage locations. The number of storage locations within display buffer 235 may, in some cases, generally correspond to the number of pixels to be displayed on display 245. For example, if display 245 is configured to include 640×480 pixels, display buffer 235 may include 640×480 storage locations storing pixel color and intensity information, such as red, green, and blue pixel values, or other color values. Display buffer 235 may store the final pixel values for each of the pixels processed by GPU 225. Display 245 may retrieve the final pixel values from display buffer 235 and display the final image based on the pixel values stored in display buffer 235.

User interface unit 205 represents a unit with which a user may interact with or otherwise interface to communicate with other units of device 200, such as CPU 210. Examples of user interface unit 205 include, but are not limited to, a trackball, a mouse, a keyboard, and other types of input devices. User interface unit 205 may also be, or include, a touch screen and the touch screen may be incorporated as part of display 245.

System memory 240 may include one or more computer-readable storage media. Examples of system memory 240 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. System memory 240 may store program modules and/or instructions that are accessible for execution by CPU 210. Additionally, system memory 240 may store user applications and application surface data associated with the applications. System memory 240 may in some cases store information for use by and/or information generated by other components of device 200. For example, system memory 240 may act as a device memory for GPU 225 and may store data to be operated on by GPU 225 as well as data resulting from operations performed by GPU 225

In some examples, system memory 240 may include instructions that cause CPU 210 or GPU 225 to perform the functions ascribed to CPU 210 or GPU 225 in aspects of the present disclosure. System memory 240 may, in some examples, be considered as a non-transitory storage medium. The term "non-transitory" should not be interpreted to mean that system memory 240 is non-movable. As one example, system memory 240 may be removed from device 200 and moved to another device. As another example, a system memory substantially similar to system memory 240 may be inserted into device 200. In certain examples, a non-transitory storage medium may store data that can, over time, change (e.g., in RAM).

System memory 240 may store a GPU driver 220 and compiler, a GPU program, and a locally-compiled GPU program. The GPU driver 220 may represent a computer program or executable code that provides an interface to access GPU 225. CPU 210 may execute the GPU driver 220 or portions thereof to interface with GPU 225 and, for this reason, GPU driver 220 is shown in the example of FIG. 2 within CPU 210. GPU driver 220 may be accessible to programs or other executables executed by CPU 210, including the GPU program stored in system memory 240. Thus, when one of the software applications executing on CPU 210 requires graphics processing, CPU 210 may provide graphics commands and graphics data to GPU 225 for rendering to display 245 (e.g., via GPU driver 220).

In some cases, the GPU program may include code written in a high level (HL) programming language, e.g., using an application programming interface (API). Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of a GPU 225 to execute commands without user knowledge as to the specifics of the hardware components. In order to process the graphics rendering instructions, CPU 210 may issue one or more rendering commands to GPU 225 (e.g., through GPU driver 220) to cause GPU 225 to perform some or all of the rendering of the graphics data. In some examples, the graphics data to be rendered may include a list of graphics primitives (e.g., points, lines, triangles, quadrilaterals, etc.).

The GPU program stored in system memory 240 may invoke or otherwise include one or more functions provided by GPU driver 220. CPU 210 generally executes the program in which the GPU program is embedded and, upon encountering the GPU program, passes the GPU program to GPU driver 220. CPU 210 executes GPU driver 220 in this context to process the GPU program. That is, for example, GPU driver 220 may process the GPU program by compiling the GPU program into object or machine code executable by GPU 225. This object code may be referred to as a locally-compiled GPU program. In some examples, a compiler associated with GPU driver 220 may operate in real-time or near-real-time to compile the GPU program during the execution of the program in which the GPU program is embedded. For example, the compiler generally represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, CPU 210 and GPU 225).

In the example of FIG. 2, the compiler may receive the GPU program from CPU 210 when executing HL code that includes the GPU program. That is, a software application being executed by CPU 210 may invoke GPU driver 220 (e.g., via a graphics API) to issue one or more commands to GPU 225 for rendering one or more graphics primitives into displayable graphics images. The compiler may compile the GPU program to generate the locally-compiled GPU program that conforms to a LL programming language. The compiler may then output the locally-compiled GPU program that includes the LL instructions. In some examples, the LL instructions may be provided to GPU 225 in the form a list of drawing primitives (e.g., triangles, rectangles, etc.).

The LL instructions (e.g., which may alternatively be referred to as primitive definitions) may include vertex specifications that specify one or more vertices associated with the primitives to be rendered. The vertex specifications may include positional coordinates for each vertex and, in some instances, other attributes associated with the vertex, such as color coordinates, normal vectors, and texture coordinates. The primitive definitions may include primitive type information, scaling information, rotation information, and the like. Based on the instructions issued by the software application (e.g., the program in which the GPU program is embedded), GPU driver 220 may formulate one or more commands that specify one or more operations for GPU 225 to perform in order to render the primitive. When GPU 225 receives a command from CPU 210, it may decode the command and configure one or more processing elements to perform the specified operation and may output the rendered data to display buffer 235.

GPU 225 may receive the locally-compiled GPU program, and then, in some instances, GPU 225 renders one or more images and outputs the rendered images to display buffer 235. For example, GPU 225 may generate a number of primitives to be displayed at display 245. Primitives may include one or more of a line (including curves, splines, etc.), a point, a circle, an ellipse, a polygon (e.g., a triangle), or any other two-dimensional primitive. The term "primitive" may also refer to three-dimensional primitives, such as cubes, cylinders, sphere, cone, pyramid, torus, or the like. Generally, the term "primitive" refers to any basic geometric shape or element capable of being rendered by GPU 225 for display as an image (or frame in the context of video data) via display 245. GPU 225 may transform primitives and other attributes (e.g., that define a color, texture, lighting, camera configuration, or other aspect) of the primitives into a so-called "world space" by applying one or more model transforms (which may also be specified in the state data). Once transformed, GPU 225 may apply a view transform for the active camera (which again may also be specified in the state data defining the camera) to transform the coordinates of the primitives and lights into the camera or eye space. GPU 225 may also perform vertex shading to render the appearance of the primitives in view of any active lights. GPU 225 may perform vertex shading in one or more of the above model, world, or view space.

Once the primitives are shaded, GPU 225 may perform projections to project the image into a canonical view volume. After transforming the model from the eye space to the canonical view volume, GPU 225 may perform clipping to remove any primitives that do not at least partially reside within the canonical view volume. For example, GPU 225 may remove any primitives that are not within the frame of the camera. GPU 225 may then map the coordinates of the primitives from the view volume to the screen space, effectively reducing the three-dimensional coordinates of the primitives to the two-dimensional coordinates of the screen. Given the transformed and projected vertices defining the primitives with their associated shading data, GPU 225 may then rasterize the primitives. Generally, rasterization may refer to the task of taking an image described in a vector graphics format and converting it to a raster image (e.g., a pixelated image) for output on a video display or for storage in a bitmap file format.

A GPU 225 may include a dedicated fast bin buffer (e.g., a fast memory buffer, such as GMEM, which may be referred to by GPU memory 230). As discussed herein, a rendering surface may be divided into bins. In some cases, the bin size is determined by format (e.g., pixel color and depth information) and render target resolution divided by the total amount of GMEM. The number of bins may vary based on device 200 hardware, target resolution size, and target display format. A rendering pass may draw (e.g., render, write, etc.) pixels into GMEM (e.g., with a high bandwidth that matches the capabilities of the GPU). The GPU 225 may then resolve the GMEM (e.g., burst write blended pixel values from the GMEM, as a single layer, to a display buffer 235 or a frame buffer in system memory 240). Such may be referred to as bin-based or tile-based rendering. When all bins are complete, the driver may swap buffers and start the binning process again for a next frame.

For example, GPU 225 may implement a tile-based architecture that renders an image or rendering target by breaking the image into multiple portions, referred to as tiles or bins. The bins may be sized based on the size of GPU memory 230 (e.g., which may alternatively be referred to herein as GMEM or a cache), the resolution of display 245, the color or Z precision of the render target, etc. When implementing tile-based rendering, GPU 225 may perform a binning pass and one or more rendering passes. For example, with respect to the binning pass, GPU 225 may process an entire image and sort rasterized primitives into bins.

The device 200 may use sensor data, sensor statistics, or other data from one or more sensors. Some examples of the monitored sensors may include IMUs, eye trackers, tremor sensors, heart rate sensors, etc. In some cases, an IMU may be included in the device 200, and may measure and report a body's specific force, angular rate, and sometimes the orientation of the body, using some combination of accelerometers, gyroscopes, or magnetometers.

In some cases, device 200 may include an extended reality manager 250. The extended reality manager may implement deep learning based techniques to determine one or more coefficients that can be transmitted to a server device (e.g., server device 110) along with other pose prediction parameters (e.g., raw pose data and a prediction time corresponding to the raw pose data). For instance, the extended reality manager 250 may utilize a deep learning system (e.g., one or more neural networks) to determine one or more coefficients based on sensor data from the one or more sensors (e.g., from one or more IMUs). Further details regarding the one or more coefficients are described herein. In some cases, the extended reality manager 250 may implement aspects of extended reality, augmented reality, virtual reality, etc.

As described herein, the server device can use the pose prediction parameters to predict a pose of the device 200. For instance, the server device may identify and generate virtual objects based on the predicted pose in accordance with the techniques described herein.

Figure 3:
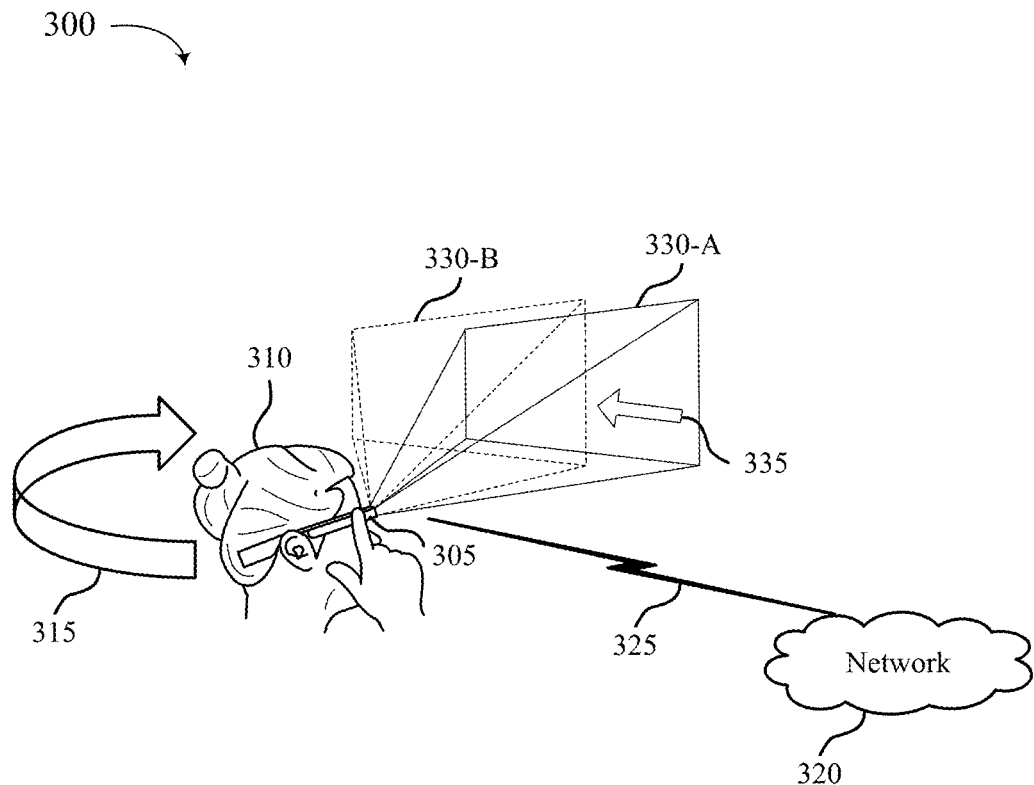
FIG. 3 is a diagram illustrating another example of a distributed XR system, according to aspects of the disclosure.

FIG. 3 illustrates an example of an extended reality system 300 that supports server-side based pose prediction for extended reality in accordance with aspects of the present disclosure. In some examples, extended reality system 300 may implement aspects of system 100 and device 200. In some cases, extended reality system 300 may include a device 305, a network 320, and a communication link 325, which may be examples of a device 105, a communication link 125, and a network 120 as described with reference to FIG. 1. As described herein, the device 305 (e.g., worn by a user 310) may account for a head motion 315 based on a deep learning model. In some cases, the device 305 may be an extended reality device, which may generally implement aspects of extended reality, virtual reality, augmented reality, etc. Systems including a device 305, a network 320, or other elements in extended reality system 300 may be referred to as extended reality systems.

The device 305 may overlay virtual objects with real world objects in a view 330. For example, the view 330 may generally refer to visual input to a user 310 via the device 305, a display generated by the device 305, a configuration of virtual objects generated by the device 305, etc. For example, view 330-A may refer to visible real world objects and visible virtual objects, overlaid on or coexisting with the real world objects, at some initial time. View 330-B may refer to visible real world objects and visible virtual objects, overlaid on or coexisting with the real world objects, at some later time. As discussed herein, positional differences in real world objects (e.g., and thus overlaid virtual objects) may arise from view 330-A shifting to view 330-B at 335 due to head motion 315.

Generally, device 305 may generate, display, project, etc. virtual objects to be viewed by a user 310 (e.g., where virtual objects may be displayed based on user 310 head pose prediction in accordance with the techniques described herein). In some examples, the device 305 may include a transparent surface (e.g., optical glass) such that virtual objects may be displayed on the transparent surface to overlay virtual objects on real word objects viewed through the transparent surface. Additionally or alternatively, the device 305 may project virtual objects onto the real world environment. In some cases, the device 305 may include a camera and may display both real world objects (e.g., as captured by the camera) and virtual objects overlaid on displayed real world objects. In various examples, device 305 may include aspects of a virtual reality headset, smart glasses, a live feed video camera, a GPU, one or more sensors (e.g., such as one or more IMUs, image sensors, microphones, etc.), one or more output devices (e.g., such as speakers, display, smart glass, etc.), etc.

In some cases, head motion 315 may include user 310 head rotations, translational head movement, etc. The view 330 of the user 310 may update according to the head motion 315. For example, the user 310 may see view 330-A before the head motion 315. In some cases, after the head motion 315, the user 310 may see view 330-B. The extended reality system (e.g., device 305) may render or update the virtual objects for display as the view 330-A shifts to view 330-B. In some cases, the virtual objects may appear delayed to the user 310 when compared with the real world objects, causing visual conflict. For example, without head motion prediction techniques described herein, updating of virtual objects in view 330-B from view 330-A may be delayed until head pose measurements are conducted such that the position, orientation, sizing, etc. of the virtual objects may be updated accordingly. In some cases, the delay may be due to system latency (e.g., end-to-end system delay between device 305 and a server device), which may be caused by rendering, time warping, or both.

In some cases, such delay may be referred to as round trip latency or dynamic registration error. In some cases, the error may be large enough that the user of device 305 may perform a head motion 315 before a time pose measurement may be ready for display. Thus, it may be beneficial to predict head motion 315 such that virtual objects associated with view 330-B may be determined and updated in real-time based on the prediction (e.g., patterns) in the head motion 315. In some cases, the dynamic registration error may be relatively large. For example, with a system delay of 100 milliseconds (ms) and moderate head rotation of 50 degrees per second, the dynamic registration error may be 5 degrees. In some examples, such as a distributed extended reality architecture (e.g., the system 100 of FIG. 1), rendering may happen at the network 320. For instance, a server device (e.g., server 110) may receive a predicted pose from the device 305, and may render virtual content based on the predicted pose received from the device 305. In such examples, the latency of the system may increase. The user 310 may perceive the dynamic registration error as a lag, as virtual objects being misplaced or appearing unnatural, etc.

Furthermore, in some cases, network interference may occur when pose information is transmitted from the device 305 to the server device, which may be due to overlapping channels in different wireless networks. When there is heavy interference, the pose information may not be received on the server device at a fixed cadence or interval of time (e.g., the pose information is received sporadically across time). If poses do not arrive before a render call at which point the server device renders virtual content, the server device may need to select an old or stale pose to render the virtual content. If the device 305 renders virtual content that is generated by the server device using a stale pose, the virtual content, when displayed, may be perceived by a user visually as translational judder which deteriorates the user experience.

Figure 4:
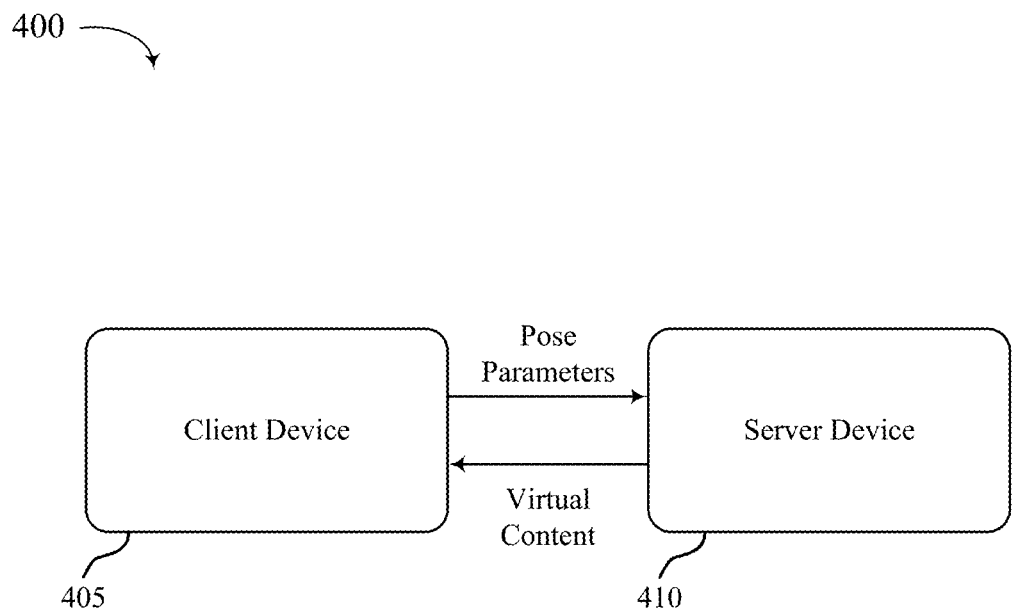
FIG. 4 is a diagram illustrating an example of an XR system, according to aspects of the disclosure.

As noted previously, systems and techniques are described herein for providing server-based pose prediction (e.g., in extended reality (XR) systems). FIG. 4 is a diagram illustrating an example of a distributed XR system 400 that can implement techniques described herein. The distributed XR system 400 includes a client device 405 in communication with a server device 410 over a wired or wireless network. The client device 405 may include an XR device (e.g., a HMD, AR glasses, etc.). In some cases, the client device 405 can be configured as the device 200 of FIG. 2 or the device 305 of FIG. 3.

Figure 5:
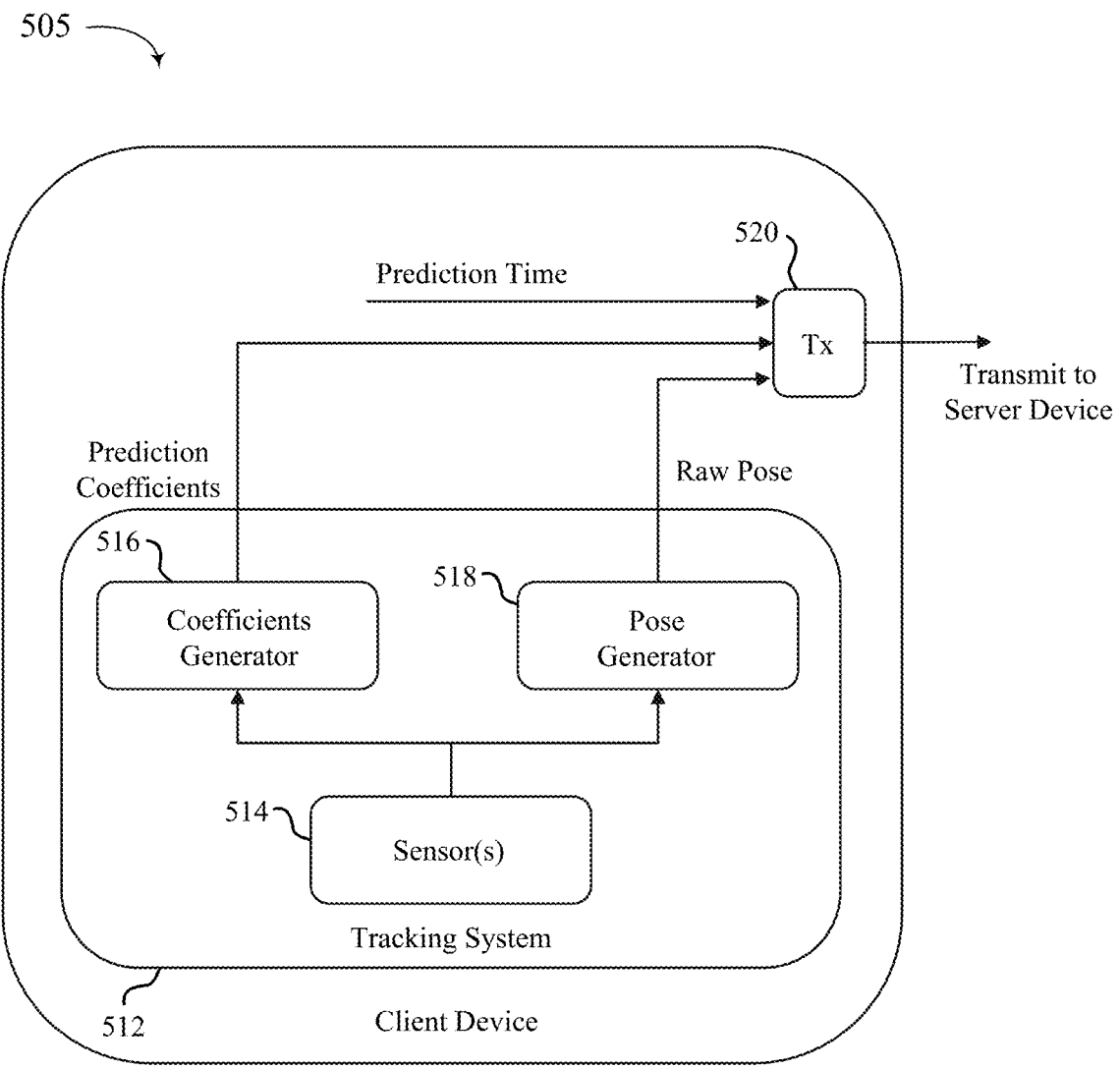
FIG. 5 is a diagram illustrating an example configuration of a client device, according to aspects of the disclosure.

As shown, the client device 405 may transmit pose prediction parameters to the server device 410. FIG. 5 is a diagram of a client device 505 illustrating an example configuration of the client device 405. The client device 505 includes a tracking system 512 and a transmitter 520 (which may be implemented as a transceiver). In some cases, the tracking system 512 is a 6 degrees-of-freedom (6 DOF) tracker that can track three degrees of rotational data (e.g., including pitch, roll, and yaw) and three degrees of translation data (e.g., a horizontal displacement, a vertical displacement, and depth displacement relative to a reference point). The tracking system 512 includes one or more sensors 514, a coefficients generator 516, and a pose generator 518.

In some cases, a set of pose prediction parameters that can be transmitted by the client device 405 to the server device 410 may include raw pose data (e.g., determined by the pose generator 518), prediction coefficients (e.g., determined by the coefficients generator 516) associated with the raw pose data, and a prediction time associated with a time at which the raw pose data is obtained. For instance, referring to FIG. 5, the raw pose data may be measured or obtained by the client device 505 based on sensor data from the one or more sensors 514. For instance, the one or more sensors 514 may include one or more IMUs (e.g., accelerometers, gyroscopes, etc.), and the sensor data may include IMU samples from the one or more IMUs. The raw pose data may include 6 DOF data representing the pose of the client device 405, such as three-dimensional rotational data (e.g., including pitch, roll, and yaw) and three-dimensional translation data (e.g., a horizontal displacement, a vertical displacement, and depth displacement relative to a reference point).

As noted above, the pose prediction data may include prediction coefficients. In some cases, the coefficients generator 516 of the client device 505 may determine the coefficients based on a polynomial used to predict a pose of the client device 505. For instance, the prediction coefficients may be bias corrected IMU coefficients. The coefficients generator 516 can determine the prediction coefficients, such as using a machine learning system or model, as described in more detail herein. The model may take into account the prediction coefficients received from the client device 505. In some cases, the client device 505 may predict a pose of the client device 505 at a future time, which may include determining the prediction coefficients. In such cases, the prediction coefficients determined by the coefficients generator 516 during prediction of the pose may be transmitted to the server device 410. In some examples, the model used to determine the prediction coefficients and in some cases the predicted pose may include a curve fitting pose on a head rate prediction. For example, the model may fit a curve on the past head rate poses as a function of time. In some examples, the model can be implemented using a machine learning system or model (e.g., a deep learning network, such as a deep neural network). Further details regarding determination of the prediction coefficients are described below with respect to FIG. 8 and FIG. 9.

A client pose prediction engine of the server device 410 (e.g., client pose prediction engine 638 of FIG. 6B or client pose prediction engine 738 of FIG. 7B, described below) may process a set of pose prediction parameters (e.g., raw pose data, prediction coefficients, and a prediction time) received from the client device 405 to predict or extrapolate a pose of the client device 405. In some examples, the server device 410 may use a current pose, historical pose data, IMU samples, side channel data, or a combination thereof to predict the pose of the client device 405 (e.g., corresponding to head position, head orientation, line of sight such as view 330, etc. of a user 310) for a future time (e.g., a time T, which may be the prediction time) according to a model. As used herein, reference to a pose of a client device (e.g., client device 405) and to a head pose of a user of the client device can be used interchangeably.

In some aspects, the server device 410 may process a set of pose prediction parameters (e.g., raw pose data, prediction coefficients, and a prediction time) from the received pose prediction parameters to predict or extrapolate poses at a fixed time interval or cadence. In such aspects, the server device 410 will continue to observe uniformly spaced pose samples as it renders content, even if reception of the pose parameters at the server device 410 is intermittent.

Figure 6A:
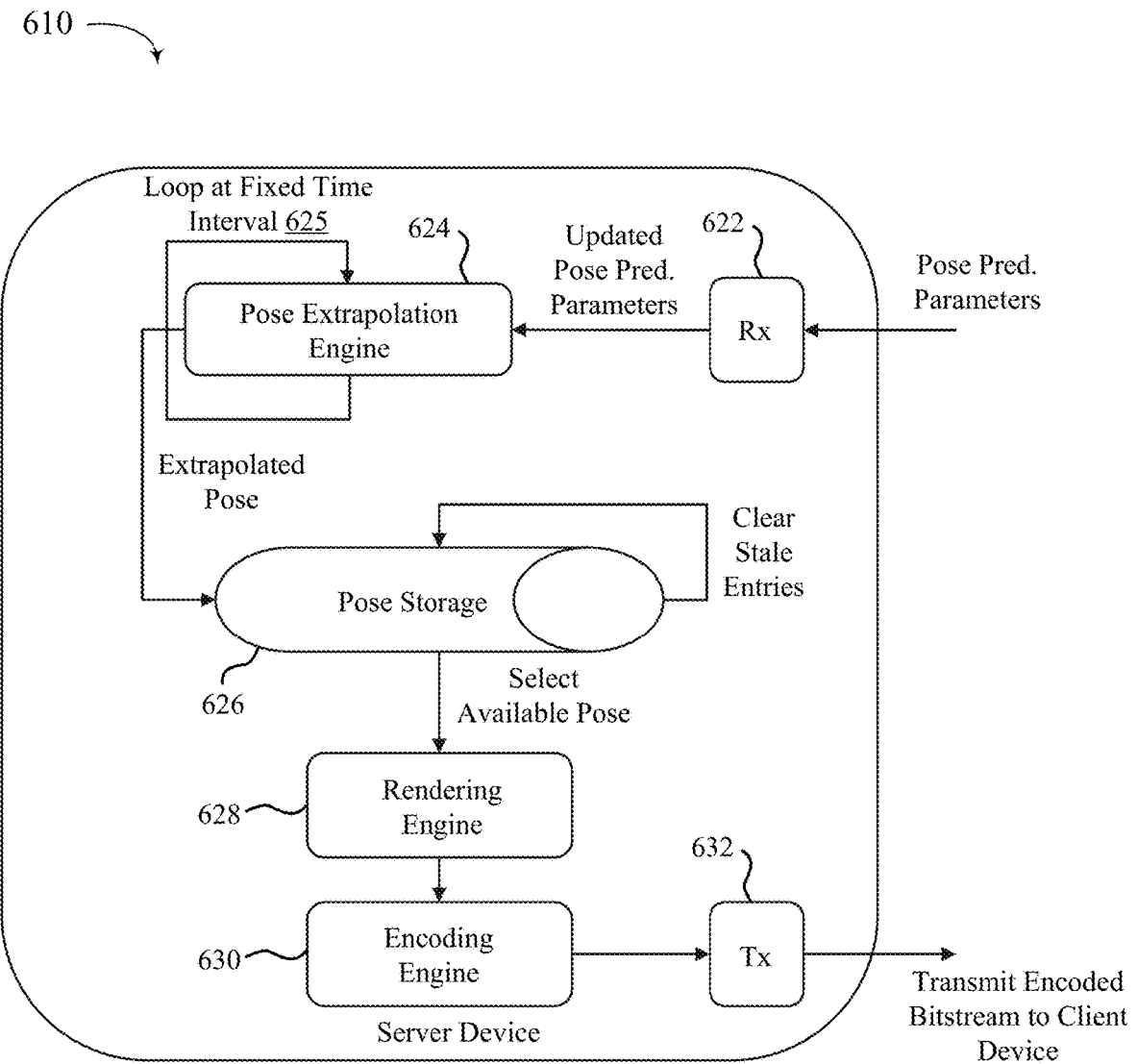
FIG. 6A is a diagram illustrating an example of a server device that is configured to predict or extrapolate poses at a fixed time interval, according to aspects of the disclosure.
Figure 6B:
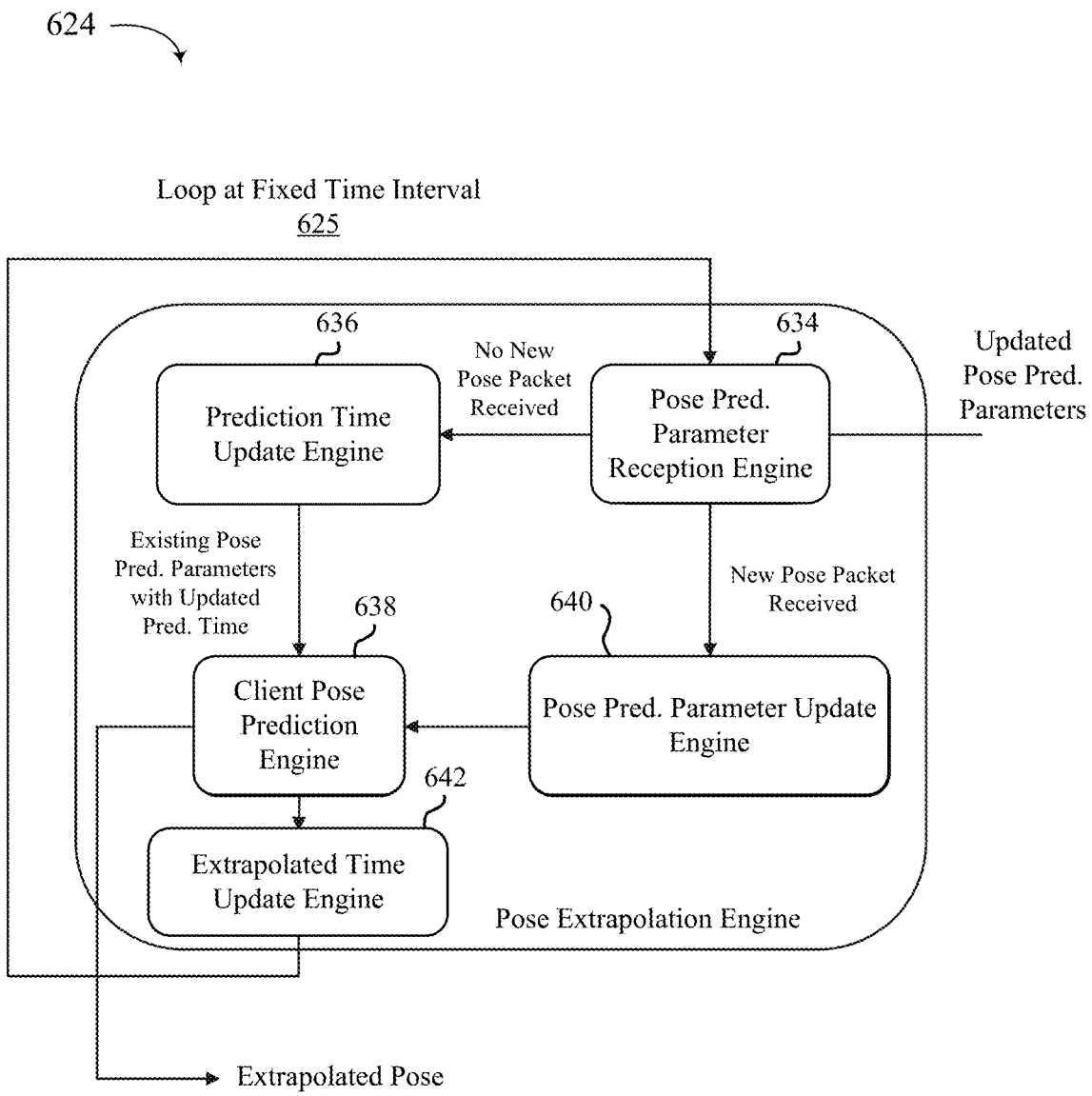
FIG. 6B is a diagram illustrating an example of a pose extrapolation engine, according to aspects of the disclosure.

FIG. 6A is a diagram of a server device 610 (as an example configuration of the server device 410) that is configured to predict or extrapolate poses at a fixed time interval 625 based on pose prediction parameters (e.g., raw pose data, prediction coefficients, and a prediction time) received from the client device 405 or the client device 505. The server device 610 includes a receiver 622 (which may be implemented as a transceiver) that is configured to receive one or more sets of pose prediction parameters (e.g., raw pose data, prediction coefficients, and a prediction time), such as from the client device 405 or the client device 505. In some examples, the client device 405 or 505 transmits the pose prediction parameters at a certain pose prediction parameter time interval, such as every 11 milliseconds (ms). The receiver 622 is configured to output updated pose prediction parameters (e.g., an updated set of pose prediction parameters) to a pose extrapolation engine 624. As shown, the pose extrapolation engine 624 is configured to extrapolate a predicted pose at each iteration of the fixed time interval 625 (e.g., extrapolate a first pose at a first iteration of the time interval 625, extrapolate a second pose at a second iteration of the time interval 625, and so on). In one illustrative example, the time interval 625 can be 2 ms, in which case the pose extrapolation engine 624 is configured to extrapolate a predicted pose every 2 ms. An illustrative example of the pose extrapolation engine 624 is shown in FIG. 6B, which is described in further detail below.

Once a pose is extrapolated or predicted, the pose extrapolation engine 624 can output the extrapolated pose to a pose storage 626. The pose storage 626 may include a buffer or other storage mechanism that is configured to store a plurality of poses. In some cases, the pose storage 626 may clear stale or old entries. In one illustrative example, the pose storage 626 may be configured to store ten poses at a time, and when a new pose is received from the pose extrapolation engine 624, the pose storage 626 can remove an oldest stored pose to make room in the pose storage 626 for the newly extrapolated pose.

A rendering engine 628 may obtain or retrieve a pose from the pose storage 626 upon determining that virtual content is to be rendered (e.g., based on a render call). In one illustrative example, virtual content can be rendered at a rendering interval of time, such as every 11 ms. In some cases, the rendering interval of time is a longer interval than the fixed time interval 625 at which a pose is extrapolated by the pose extrapolation engine 624. The rendering engine 628 may then render virtual content at the predicted pose retrieved from the pose storage 626. The rendering engine 628 may output the rendered virtual content to an encoding engine 630, which can compress (or encode) the virtual content. A transmitter 632 may transmit the compressed/encoded virtual content as a bitstream to the client device 405 or the client device 505. In some cases, the transmitter 632 may be implemented as part of a transceiver, which may be the same or different from the transceiver associated with the receiver 622. The client device 405 or client device 505 can receive the virtual content (and in some cases decompress or decode the virtual content) from the server device 610 and display the virtual content (e.g., via a display of the client device 405/505).

As noted above, FIG. 6B is a diagram of an illustrative example of the pose extrapolation engine 624. As shown, a pose prediction parameter reception engine 634 receives the updated pose prediction parameters from the receiver 622. At each iteration of the fixed time interval 625, the pose prediction parameter reception engine 634 determines whether a new pose packet with an updated set of pose prediction parameters has been received. For example, as noted above, the pose prediction parameter time interval may be a longer interval than the fixed time interval 625 (e.g., the pose prediction parameter time interval may be 11 ms and the fixed time interval 625 may be 2 ms), in which case the pose extrapolation engine 624 will predict a pose more often than it receives updated pose prediction parameters.

If the pose prediction parameter reception engine 634 determines that a new pose packet has not be received at a given iteration of the fixed time interval 625, a prediction time update engine 636 will update a prediction time to take into account the amount of time that has passed since the last time the pose extrapolation engine 624 predicted and extracted a pose. For instance, the prediction time update engine 636 can determine an updated prediction time based on a current time and a previous pose prediction time. In one illustrative example, the updated prediction time can be determined by incrementing the existing prediction time by an amount equal to the current time minus the previous pose prediction time (updated prediction time=current prediction time+(current time−previous pose prediction time)). In the example of 2 ms for the fixed time interval 625, the prediction time update engine 636 can add a multiple of 2 ms to the prediction time at each iteration of the fixed time interval 625 until a new pose prediction parameter packet is received. The prediction time update engine 636 can then output the existing pose prediction parameters and the updated prediction time to the client pose prediction engine 638. The client pose prediction engine 638 can then predict a pose of the client device based on the existing pose prediction parameters and the updated prediction time, which will take into account any movement of the client device 405 or 505 that may have occurred since the last time a pose was predicted (e.g., at a last iteration of the fixed time interval 625). The client pose prediction engine 638 can output the predicted pose to the pose storage 626 shown in FIG. 6A.

If the pose prediction parameter reception engine 634 determines that a new pose packet (e.g., including updated raw pose data, updated prediction coefficients, and an updated prediction time) is received at a given iteration of the fixed time interval 625, a pose prediction parameter update engine 640 can update the pose prediction parameters to those included in the new pose packet, and output the updated pose prediction parameters to the client pose prediction engine 638. The client pose prediction engine 638 can predict a pose of the client device based on the updated pose prediction parameters, such as the updated raw pose data, updated prediction coefficients, and an updated prediction time. The client pose prediction engine 638 can output the predicted pose to the pose storage 626 shown in FIG. 6A.

Once the client pose prediction engine 638 predicts a pose of the client device (e.g., based on the existing pose prediction parameters and the updated prediction time or based on updated pose prediction parameters), an extrapolated time update engine 642 can update the previous extrapolated time to a present or current time for a next iteration of the fixed time interval 625. The updated previous extrapolated time can be used by the prediction time update engine 636 to update the prediction time in the event a new pose packet is not received at the next iteration of the fixed time interval 625.

Returning to FIG. 4, in some cases, the server device 410 may use the set of pose prediction parameters (e.g., raw pose, prediction coefficients, and prediction time) to predict or extrapolate poses upon determining that virtual content is to be generated (e.g., in response to receiving a pose request from a rendering engine of the server device 410, such as at a render call). For instance, the server device 410 may use a set of pose prediction parameters (e.g., raw pose data, prediction coefficients, and a prediction time) to generate poses just before a render call of the rendering engine. In one illustrative example, the rendering engine can request a pose from a pose extrapolation engine of the server device 410. The pose extrapolation engine may predict or extrapolate a pose based on a recent (e.g., a most recent) set of prediction parameters (e.g., raw pose data, prediction coefficients, and a prediction time) and output the predicted pose to the rendering engine.

Figure 7A:
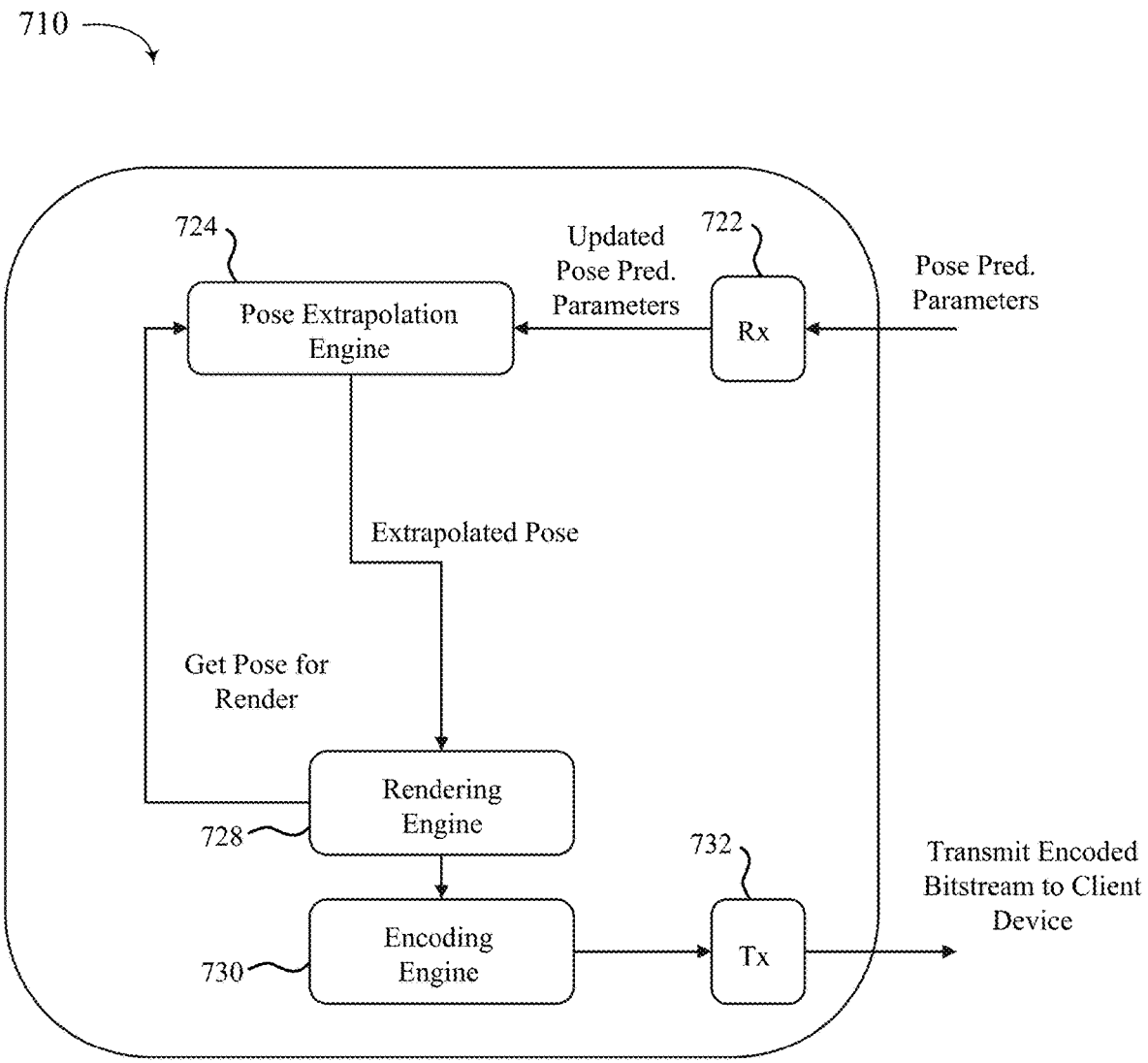
FIG. 7A is a diagram illustrating an example of a server device that is configured to predict or extrapolate poses upon determining that virtual content is to be generated, according to aspects of the disclosure.

FIG. 7A is a diagram of a server device 710 (as an example configuration of the server device 410) that is configured to predict or extrapolate poses upon determining that virtual content is to be generated. The server device 710 includes a receiver 722 (which may be implemented as a transceiver) that is configured to receive one or more sets of pose prediction parameters (e.g., raw pose data, prediction coefficients, and a prediction time), such as from the client device 405 or the client device 505. The receiver 722 is configured to output updated pose prediction parameters (e.g., an updated set of pose prediction parameters) to a pose extrapolation engine 724. As shown, the pose extrapolation engine 724 is configured to extrapolate a predicted pose in response to receiving a pose request from a rendering engine 728. In some cases, the rendering engine 728 can send the pose request at each render call, corresponding to a time at which the rendering engine 728 is configured to render virtual content. An illustrative example of the pose extrapolation engine 724 is shown in FIG. 7B, which is described in further detail below.

Once a pose is extrapolated or predicted, the pose extrapolation engine 724 can output the extrapolated pose to the rendering engine 728. The rendering engine 728 may then render virtual content (e.g., based on a render call) using the predicted pose received from the pose extrapolation engine 724. The rendering engine 728 may output the rendered virtual content to an encoding engine 730, which can compress (or encode) the virtual content. A transmitter 732 may transmit the compressed/encoded virtual content as a bitstream to the client device 405 or the client device 505. In some cases, the transmitter 732 may be implemented as part of a transceiver, which may be the same or different from the transceiver associated with the receiver 722. The client device 405 or client device 505 can receive the virtual content (and in some cases decompress or decode the virtual content) from the server device 710 and display the virtual content (e.g., via a display of the client device 405/505).

Figure 7B:
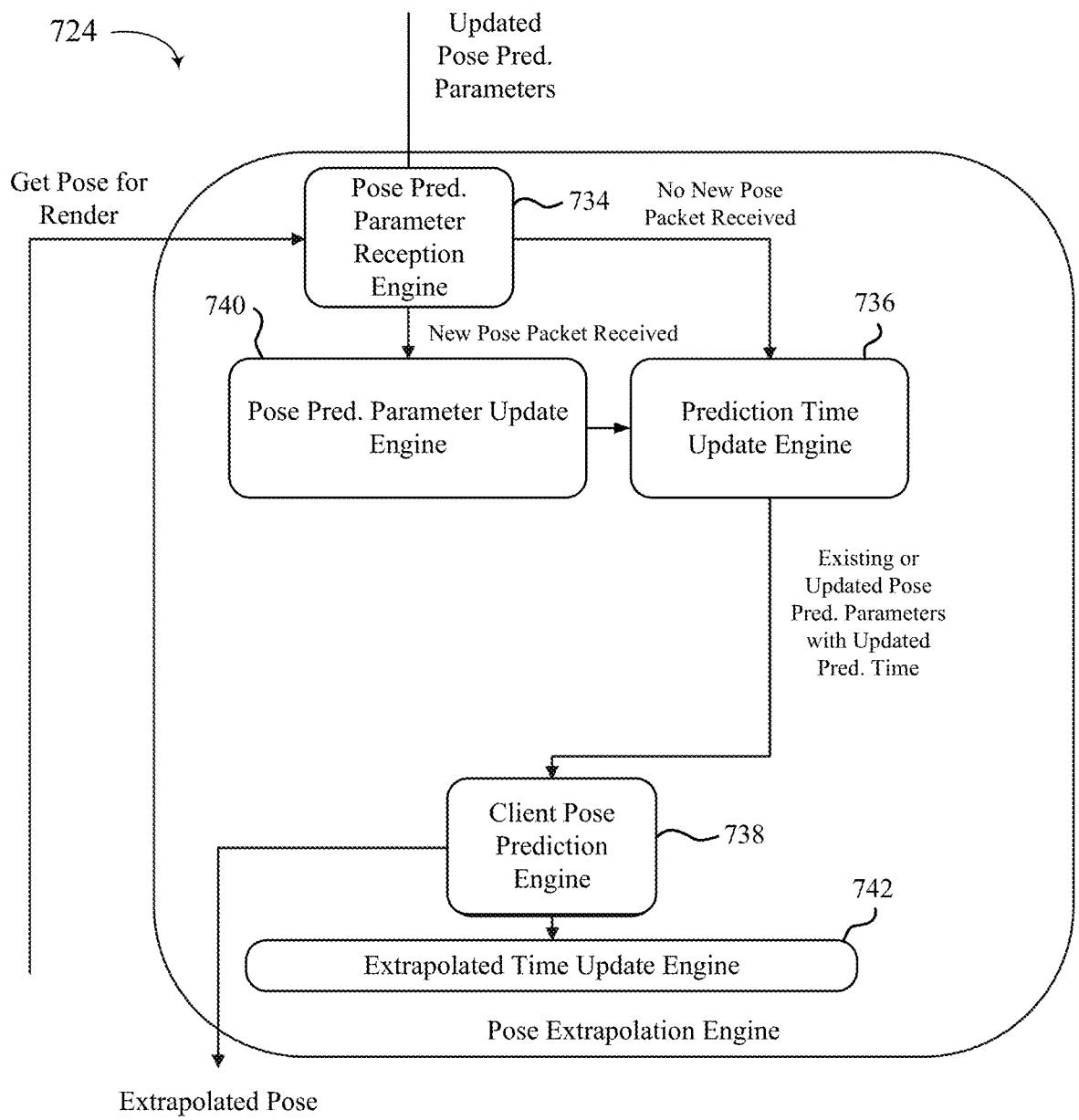
FIG. 7B is a diagram illustrating another example of a pose extrapolation engine, according to aspects of the disclosure.

As previously noted, FIG. 7B is a diagram of an illustrative example of the pose extrapolation engine 724. As shown, a pose prediction parameter reception engine 734 receives the updated pose prediction parameters from the receiver 722. Upon receiving a pose request from the rendering engine 728, the pose prediction parameter reception engine 734 determines whether a new pose packet with an updated set of pose prediction parameters has been received. In some cases, the pose prediction parameter time interval at which pose prediction parameters are received from the client device 405/505 (or at which the pose parameters are transmitted by the client device 405/505) may be a longer interval than the rendering interval (e.g., the pose prediction parameter time interval may be 11 ms and the rendering interval may be 5 ms), in which case the pose extrapolation engine 724 will predict a pose more often than it receives updated pose prediction parameters.

If the pose prediction parameter reception engine 734 determines that a new pose packet has not be received, a prediction time update engine 736 can update the prediction time to take into account the amount of time that has passed since the last time the pose extrapolation engine 724 predicted and extracted a pose. For instance, if a new pose packet is not received, the prediction time update engine 736 can determine an updated prediction time based on a current time and a previous pose prediction time. In one illustrative example, the updated prediction time can be determined by incrementing the existing prediction time by an amount equal to the current time minus the previous pose prediction time (updated prediction time=current prediction time+(current time−previous pose prediction time)). In the example of 5 ms for the rendering interval, the prediction time update engine 736 can add a multiple of 5 ms to the prediction time each time a pose request is received until a new pose prediction parameter packet is received. In such cases when a new pose packet is not received, the prediction time update engine 736 can output the existing pose prediction parameters and the updated prediction time to the client pose prediction engine 738. The client pose prediction engine 738 can predict a pose of the client device based on the existing pose prediction parameters and the updated prediction time, which will take into account any movement of the client device 405 or 505 that may have occurred since the last time a pose was predicted (e.g., the last time a pose request was received). The client pose prediction engine 738 can output the predicted pose to the rendering engine 728 shown in FIG. 7A.

If, in response to receiving a pose request, the pose prediction parameter reception engine 734 determines that a new pose packet (e.g., including updated raw pose data, updated prediction coefficients, and an updated prediction time) is received, a pose prediction parameter update engine 740 can update the pose prediction parameters to those included in the new pose packet. The pose prediction parameter update engine 740 can output the updated pose prediction parameters to the prediction time update engine 736. The prediction time update engine 736 can update the prediction time to take into account the time at which the pose packet was received. For instance, the prediction time update engine 736 can determine an updated prediction time based on a current time and the time associated with when the updated set of pose prediction parameters is received. In one illustrative example, if the rendering engine 728 requests a pose from the pose extrapolation engine 724 at time t but the last pose packet was received at t–5 ms, then the prediction time update engine 736 can determine the updated prediction time by incrementing the existing prediction time by 5 ms. In such cases when a new pose packet is received, the prediction time update engine 736 can output the updated pose prediction parameters (e.g., the updated raw pose data, updated prediction coefficients, and an updated prediction time) to the client pose prediction engine 738. The client pose prediction engine 738 can predict a pose of the client device based on the updated pose prediction parameters, such as the updated raw pose data, updated prediction coefficients, and an updated prediction time. The client pose prediction engine 738 can output the predicted pose to the rendering engine 728 shown in FIG. 7A.

Once the client pose prediction engine 738 predicts a pose of the client device (e.g., based on the existing pose prediction parameters and the corresponding updated prediction time or based on updated pose prediction parameters and the corresponding updated prediction time), an extrapolated time update engine 742 can update the previous extrapolated time to a present or current time for a next time a pose request is received. The next time a pose request is received, the updated previous extrapolated time can be used by the prediction time update engine 736 to update the prediction time.

As noted above, in some aspects, a model may be used by the client device 405 and/or the server device 410 (e.g., the client pose prediction engine 638 or the client pose prediction engine 738) to determine a predicted pose. In some cases, the client device 405 can use the model to determine the prediction coefficients of the pose prediction parameters. In some examples, the model include a curve fitting pose on a head rate prediction. In some cases, the client pose prediction engine 638 of FIG. 6B or client pose prediction engine 738 of FIG. 7B may predict a future head pose based on the fitted curve. In some cases, the model may be based on a Kalman filter, an extended Kalman filter (EKF), or a combination with higher order derivatives as part of the internal state of the system. In such cases, the model may implement different filters for rotation (e.g., with an EKF model) and translation (e.g., with a Kalman filter model). However, in some cases, higher order derivatives may cause noise in the system. In other examples, the model may be a time series prediction on a pose (e.g., an autoregression (AR), a moving average (MA), or an ARMA model). Such examples may result in a prediction time larger than 50 ms.

In some cases, the client pose prediction engine 638 of FIG. 6B or client pose prediction engine 738 of FIG. 7B may implement a difference method and exponential smoothing to compute derivatives (e.g., the derivative of a bias corrected gyroscopic rotation samples may be angular acceleration, etc.). Additionally or alternatively, the client pose prediction engine 638/738 may damp output using higher order derivatives to reduce pose jitter. The model used for predicting head pose may be corrected according to Equation 1, where t may refer to an incremental difference in time, T may refer to a future time (corresponding to a prediction time), P may indicate the head pose prediction model, and A and B may be system constants.

$$\delta P(t, t+T) = \dot{P}(t)T + A\ddot{P}(t)T^2 + B\dddot{P}(t)T^3 + \cdots \qquad \text{Equation 1}$$

In some cases, smoothing coefficients and damping factors may be computed (e.g., offline) using a grid search to increase accuracy of the computed pose (e.g., the mean square error (MSE) may be closer to the actual pose, or ground truth pose). Such an approach may be used for prediction time up to 30-40 ms (e.g., as compared with prediction times larger than 50 ms, which may be desirable).

In some cases, prediction techniques may benefit from taking range of motion into account (e.g., head pose of a user 310 may have a restricted freedom of motion, for example, due to human anatomy and resulting limitations in head movement). In some cases, the prediction techniques may incorporate range of motion, machine learning models, side channel data, etc.

The client device 405 may use deep learning based techniques to determine the prediction coefficients. In one illustrative example, the client device 405 may use a neural network to implement various machine learning techniques. In some machine learning examples, the network may train a machine learning model on a set of training data. The training data may be a subset of a larger dataset. In some cases, the training may involve determining one or more target features in the dataset. Subsequently, the model may learn the one or more features from the training data (e.g., based on linear regression techniques, such as a linear regression algorithm) and evaluation metrics, such as MSE, precision, accuracy, and recall. In some cases, the evaluation metrics may be calculated according to a loss function. Once the model is trained such that it fits the training data (e.g., based on the determined one or more features), the model may be used on a subset of data from the larger data set that is different from the training data. This subset of data may be referred to as validation data. The validation data set may be used to further tune the model. In some cases, the model may be used for predictions or decisions related to the feature. Examples of the machine learning model may implement techniques such as linear regression, logistic regression, decision tree, support vector machine (SVM), naïve Bayes, k-nearest neighbor, random forest, dimensionality reduction algorithms, gradient boosting algorithms, or any combination thereof.

Some examples of a machine learning model may implement supervised learning techniques as described herein. In some cases, supervised learning techniques may involve the model learning one or more features from a set of training data based on example input-output pairs. For example, a learning function may map an input to an output based on the input-output pairs. The mapping may involve labeled training data based on the presence of one or more features. Supervised machine learning techniques may use classification, regression, or both to learn the one or more features. In some examples, the learning function may implement linear regression, logistic regression, naïve Bayes, any similar learning techniques, or a combination thereof. In some cases, the machine learning model may implement semi-supervised learning techniques in which a portion of the training data may have labels and another portion may not. For example, a small portion of labeled training data may be used in combination with a large portion of unlabeled training data for a learning function. The semi-supervised learning technique may reduce the complexity of the training process (e.g., due to labeling the training data based on features and human supervision).

Some examples of a machine learning model may implement unsupervised learning techniques as described herein. In some cases, unsupervised learning techniques may involve the model learning one or more features from a set of training data based on previously undetected patterns in the data set. In some cases, the unsupervised learning techniques may include grouping, or clustering, the data in the training data set based on commonalities in the data. Additionally or alternatively, the unsupervised learning techniques may include association based on patterns in the training data. Unsupervised learning may implement density estimation in statistics. For example, an unsupervised learning technique may model probability densities over the inputs. Some possible learning functions may include k-means for clustering related application, Apriori techniques for associated rule related application, any similar learning techniques, or a combination thereof.

Some examples of a machine learning model may implement reinforcement learning techniques as described herein. In some cases, reinforcement learning techniques may implement dynamic programming techniques in which the model may be trained according to feedback and a learning function. For example, the model may use positive or negative feedback to reinforce a value-based reinforcement learning method, a policy-based reinforcement learning method, or a model-based reinforcement learning method. Some examples of reinforcement learning models may include Markov Decision Process, Q learning, any similar learning techniques or models, or a combination thereof.

Figure 8:
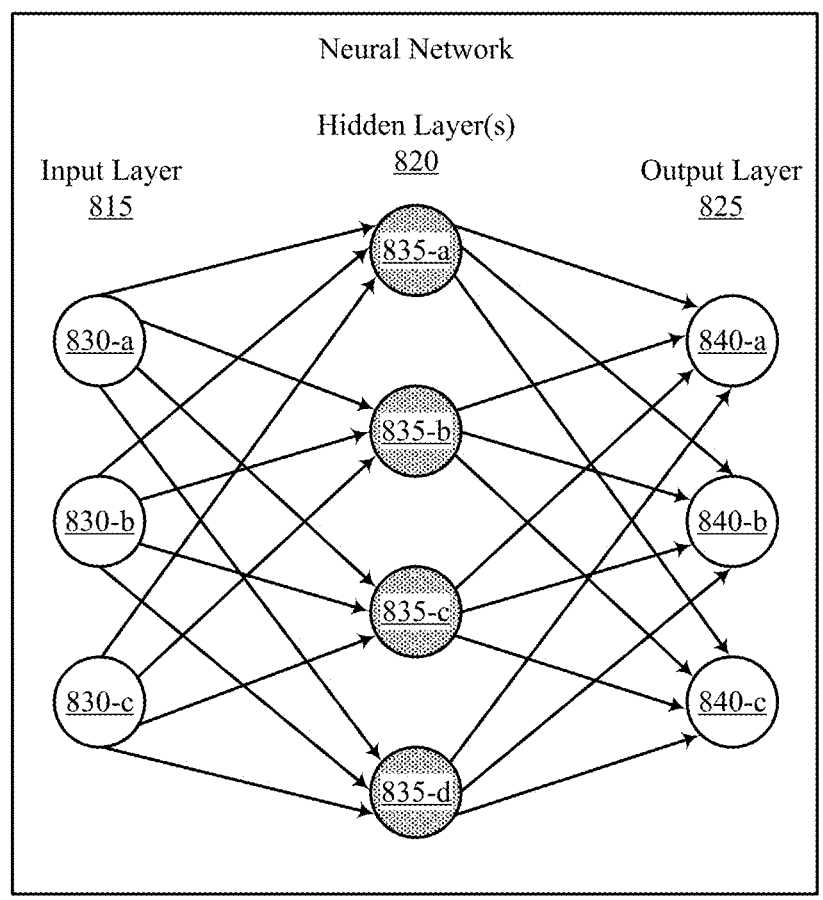
FIG. 8 is a diagram illustrating an example of a deep neural network that supports server-side pose prediction, according to aspects of the disclosure.

In some examples, machine learning may be implemented by a deep learning model, such as a deep neural network (e.g., artificial neural network (ANN)). FIG. 8 is a diagram illustrating an example of a deep neural network 810, which may include an input layer 815, an output layer 825, and one or more hidden layers 820. Each layer may include an interconnected group of artificial neurons (e.g., nodes). For example, the input layer 815 may include nodes 830-*a*, 830-*b*, and 830-*c*. The hidden layer 820 may include nodes 835-*a*, 835-*b*, 835-*c*, and 835-*d*. The output layer 825 may include nodes 840-*a*, 840-*b*, and 840-*c*. The connections between the nodes may be referred to as edges. The edges may be associated with a weight, which may be adjusted during the learning process (as part of training of the deep neural network 810). In some cases, the weight may correspond to an increase or decrease of the value, or importance, of the node at each layer. The neural network (e.g., the ANN) may be used in applications that involve regression and classification. Some additional implementations of deep learning may include convolutional neural networks, which may be used for computer vision, recurrent neural networks, which may be used for time series analysis, self-organizing maps, which may be used for feature extraction, Boltzmann machines, which may be used for recommendation systems, auto encoders, which may be used for recommendation systems, etc.

In some examples, each layer of the neural network 810 may implement an activation function that may correspond to one or more features in a set of data. The activation function may convert an input signal for a node to an output signal. The output signal may be used in the next layer of the neural network (e.g., for an ANN). The activation function may correspond to whether the node may be activated based on calculating the weighted sum of the node and adding bias, which may introduce non-linearity to the output of the node. In some cases, the activation function may implement a threshold activation function (e.g., a binary step function). In such cases, if the input value for a node is above or below a threshold value, the node may be activated. The node may send the signal to the next layer. In some cases, the activation function may implement a sigmoid activation function (e.g., a logistic function) to predict a probability as an output. In some examples, the activation function may implement rectified linear units (ReLu).

In some cases, the neural network 810 may implement activation functions for each additional layer of the network (e.g., for hidden layers 820 between the input layer 815 and the output layer 825). The neural network 810 may also implement a loss function, or cost function, based on the difference between an actual value and a predicted value. For each layer of the neural network 810, the cost function may be used to adjust the weights for the next input. In some examples, the cost function, or loss function, may implement an MSE function, which may calculate the square of the difference between the actual value and the predicted value. Once the neural network 810 has been trained (e.g., based on the activation function and adjusting the weights), the neural network 810 may be used for pattern classification, prediction (e.g., for financial analysis), control and optimization (e.g., calibration), or combination thereof.

In some examples, inputs 830 to the machine learning model, or neural network 810 (e.g., at input layer 815), may include data from a client device such as client device 405 or 505 (e.g., statistics related to use of an application of the client device, real-time parameters related to future action, or a combination) or sensor statistics, or both, for one or more users. In some cases, inputs 830-*a*, 830-*b*, and 830-*c* (collectively referred to as inputs 830) to the neural network 810 may include IMU samples provided by one or more IMU sensors and/or a tracking system (e.g., a 6 DOF tracking system). In some cases, inputs 830 to the machine learning algorithm may include side channel data paired with sensor statistics. In some cases, the neural network 810 may be trained online on application data (e.g., the neural network 810 may be able to learn the application specific pattern to better predict client device/head pose). In some examples, the last layer or last two layers (e.g., of hidden layers 820) of the neural network 810 may be fully connected layers trained for samples with high prediction error.

An output 840 of the machine learning model may include prediction coefficients or a predicted head pose determined based on the prediction coefficients (e.g., based on an input 830 of sensors statistics such as one or more IMU measurements). For example, the machine learning techniques may include a model that predicts pose coefficients based on inputs 830 of sensor measurements, side channel data, etc. As discussed previously, one or more aspects of the neural network 810 may be implemented to output prediction coefficients that the client device can transmit to a server device (e.g., server device 410, server device 610, or server device 710), which the server device can then use to predict a pose of the client device (e.g., at a future time T) for improved generation, rendering, display, etc. of virtual objects (e.g., such that the virtual objects may be visible by the user at a time T in accordance with the user's predicted head pose at the time T).

Figure 9:
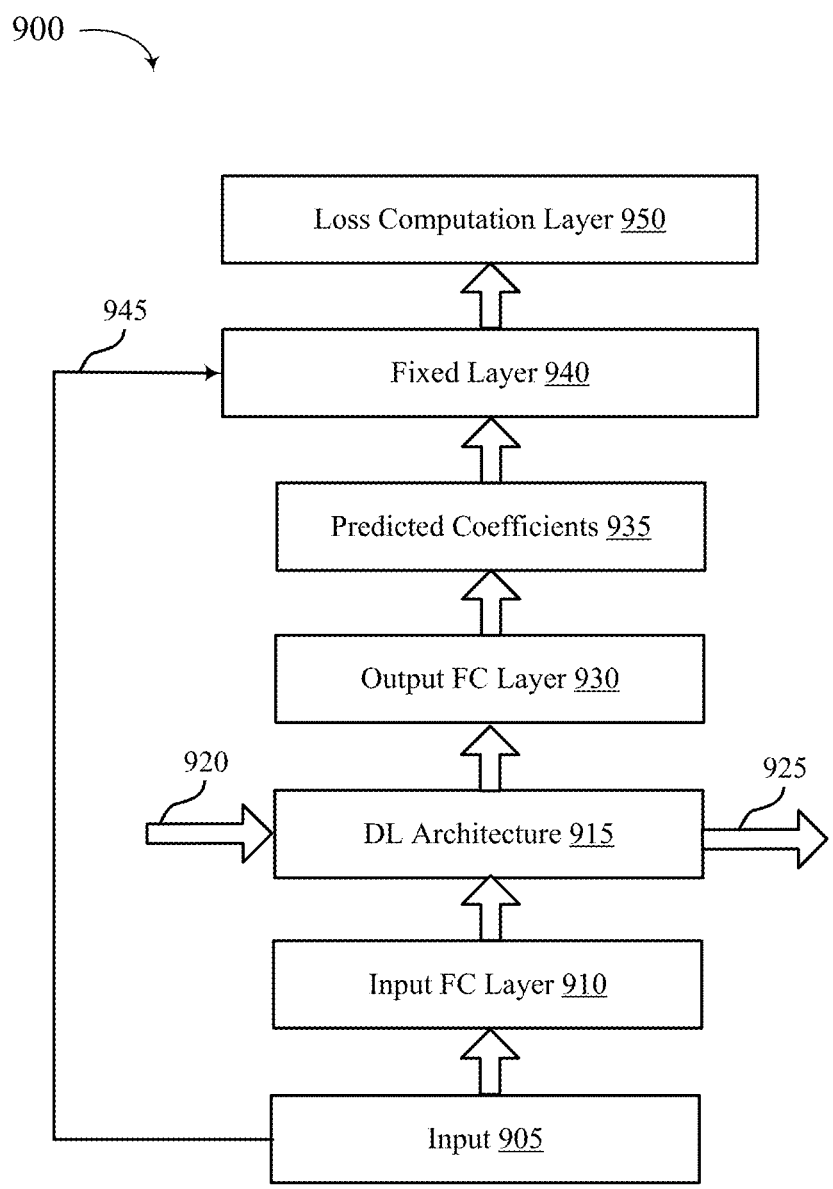
FIG. 9 is a flow diagram illustrating an example of a process that supports server-side pose prediction, according to aspects of the disclosure.

FIG. 9 is a flow diagram illustrating an example of a process 900 (e.g., a model) that supports server-side pose prediction in accordance with aspects of the present disclosure. In some examples, process 900 may implement aspects of a device. For example, a client device (e.g., client device 405 or client device 505) may implement aspects of the process 900 for determining prediction coefficients and/or a predicted pose using the determined prediction coefficients. In another example, a server device (e.g., server device 410, server device 610, or server device 710) may implement aspects of the process 900 for determining a predicted pose using prediction coefficients received from a client device. In some cases, process 900 may include input 905 and fully connected layers 910 and 930, which may be examples of input 830 and hidden layers 820 as described with reference to FIG. 8. For example, the input 905 may include input values, such as sensor data received from the one or more sensors 514 (e.g., IMU samples from one or more IMUs).

In some cases, the process 900 may have one or more layers, which may correspond to one or more functions. For example, the process 900 may use the input 905 (e.g., at input FC layer 910) to model head pose as a polynomial over the predicted time interval. Generally, one or more aspects of the process 900 may be implemented to determine prediction coefficients for a future relative head pose prediction function, to predict a future relative head pose, etc. For example, in some cases, one or more aspects of the process 900 may implement machine learning (e.g., that accounts for side channel data, IMU measurements, etc.) to derive a prediction model or prediction function for estimating future relative head pose (e.g., at some time T, which may thus be used for virtual object generation, rendering, display, etc. at various times T).

In some examples, the process 900 may implement a Taylor series approximation using an se3_exp( ) function, as shown in Equation 2, to predict the relative head pose, where T is the prediction time.

$$\widehat{\delta P}_{(t,t+T)} = se3\_exp(a(t)T + b(t)T^2 + c(t)T^3 + \cdots) \quad \text{Equation 2}$$

In some cases, the device may use one or more layers of process 900 to determine the prediction coefficients a(t), b(t), and c(t) and the degree of the polynomial. In the event a client device (e.g., client device 405 or client device 505) performs aspects of the process 900, the client device can transmit the prediction coefficients a(t), b(t), and c(t) to a server device (e.g., server device 410, server device 610, or server device 710). In the event a server device (e.g., server device 410, server device 610, or server device 710) performs aspects of the process 900, the server device can receive the prediction coefficients a(t), b(t), and c(t) from a client device (e.g., client device 405 or client device 505) and the server can predict the relative head pose (corresponding to the pose of the client device).

In one example, layer 910 may be a fully connected layer and the input 905 may be passed through the fully connected layer 910. The fully connected layer 910 may convert the input 905 (e.g., the IMU samples) into a higher dimensional vector. Then, the higher dimensional vector may be passed into a deep learning architecture at layer 915. In some cases, the process 900 may implement a long short-term memory (LSTM) based architecture at layer 915 if the input 905 is sequential. The LSTM based architecture may use the higher dimensional vector from layer 910, a history of past sensor statistics 920 (e.g., the IMU samples, $h_{in}$), or both. The output (e.g., $h_{out}$) of the LSTM architecture at layer 915 may be saved at 925 (e.g., to be applied to the next input) and may be passed through a fully connected layer 930. The fully connected layer 930 may convert the output of the LSTM at layer 915 to predicted coefficients of the process 900, such as predicted coefficient 935 (e.g., coefficients a(t), b(t), and c(t)).

In some cases, once the process 900 has the predicted coefficients 935 and the prediction time, T, the polynomial at Equation 2 may be used at fixed layer 940 to determine the predicted head pose (e.g., corresponding to the input 905, shown at 945) by the server device (and in some cases the client device). In some cases, the approximation may have a low degree polynomial if the prediction time is relatively short (e.g., if head pose is to be predicted relatively near future, or at smaller times T). In other cases, the approximation may have a higher degree (e.g., higher order) polynomial if the prediction time is relatively long (e.g., if head pose is to be predicted relatively further future, or at larger times T). In some cases, a neural network (e.g., neural network 810 of FIG. 8) may be trained by computing a loss at loss computation layer 950, which may be the difference between the predicted pose from fixed layer 940 and a ground truth pose (e.g., the pose from training data). In some cases, the process 900 may propagate the loss at loss computation layer 950 to the network 120 (e.g., to train the process 900).

In some examples, the process 900 may use an se(3) function to predict translation, rotation, or both for the head pose corresponding to the pose of the client device. For example, a rotational model may have 3 parameters related to a unit rotational axis ($\hat{\omega}$) and an angle of rotation ($\theta$). Additionally or alternatively, a translational model may have 3 parameters (e.g., horizontal, vertical, and depth). Both the rotational model and the translational model combined may define a screw axis. Rotation, translation, or both around the screw axis may correspond to rigid body motion in three dimensions.

In some cases, the process 900 may use bias corrected IMU coefficients to determine the predicted head pose corresponding to the pose of the client device. For example, the process 900 may use Equation 3 as input to the deep learning architecture layer 915 (e.g., an LSTM architecture), where $\omega^b(t)$ is the angular velocity in a body frame, $\omega^g(t)$ is the angular velocity in a gyroscope frame, $R_{bg}$ is the relative orientation between the body and the gyroscope, $b_g$ is the gyroscope bias, $b_a$ is the accelerometer bias, $A_g$ and $A_a$ are non-orthogonality and scale factors, $\alpha^b(t)$ is linear acceleration in the body frame, and $y^b$ is gravity in the body frame.

$$\omega^b(t) = R_{bg} A_g^{-1}(\omega^g(t) - b_g), \alpha^b(t) = A_a^{-1}(y_{acc}^b(t) - b_a) \quad \text{Equation 3}$$

Equation 3 may correspond to bias corrected acceleration and gyroscopic samples. In some cases, given the history of sensor statistics 920 (e.g., corresponding to a hidden state) and the input from Equation 3 (e.g., ($\omega^g(t)$, $\alpha^b(t)$), the relative time pose (e.g., in se(3) for a prediction time T) may be computed according to Equation 4. For examples, Equation 4 may be used (e.g., by a network) to predict coefficients $a_r(t)$ for rotation and translation at a time, t.

$$\widehat{\delta P}_{(t,t+T)} = a(t)T + b(t)T^2 + c(t)T^3 + \cdots \quad \text{Equation 4}$$

In some cases, the loss function at loss computation layer 950 may be calculated according to an MSE loss of a relative pose over a time interval (e.g., 100 ms). For example, if there are 10 samples over the prediction time of 100 ms, the average MSE may be computed over all the samples with respect to the ground truth pose in se(3) (e.g., by computing the L2 norm of the change in pose in se(3)). Additionally, the loss function may have a term that accounts for jitter.

In some cases, the process 900 may include uncertainty in the prediction. For example, the uncertainty may be included as a function of the prediction error. In some cases, if the prediction error is lower, there may be a direct correlation with uncertainty. The prediction uncertainty may be used to infer information related to rendering and processing time. In some cases, if the uncertainty is low, then the extra rendering will be relatively low as well. That is, in some cases extra rendering may occur to compensate for pose prediction error, so if the pose prediction error is relatively low, the uncertainty may be low as well. Thus, prediction uncertainty may be used to determine the amount of extra rendering.

In some cases side information, such as application information or data associated with the extended reality system, may be used in addition, or as an alternative, to train or update the process 900. For example, the machine learning based pose prediction (e.g., the prediction generated by process 900) may learn the pattern in head pose motion. In some cases, the process 900 may account for the limited range of motion of a human head (e.g., limited degree of rotation, restricted freedom, etc.). In some cases, sudden changes in head position or head motion may cause uncertainty in the model. Thus, it may be beneficial to use the application information or data to predict the sudden change.

In some cases, the application information or data may correspond to a game, or application, content. For example, there may be an event (e.g., in a game) that may cause a sudden change of head position at a user. The application information or data may be used to determine whether the user may likely change head position. Similarly, the process 900 may use eye gaze tracking data to figure out what the user may be looking at, then use that information to predict a sudden change in head position. For example, if the user is chasing or tracking a moving ball in augmented reality, then if the rendered ball changes directions, the head pose of the user may also change directions to follow the ball. Additionally or alternatively, the process 900 may use body pose estimation output to determine capabilities related to range of human motion. In some cases, the process 900 may implement posture detection and use the results to determine a range of motion. For example, if a user is sitting in a chair, the range of motion for the head pose may be different than standing up. In some examples, audio data may be used to determine, or predict, user head pose or head movement (e.g., rotationally towards a source of a sound). In some examples, using the application information or data may improve the accuracy of the head pose prediction (e.g., for sudden changes in head pose).

In some examples, the deep learning based pose prediction model trained on offline data (e.g., trained based on process 900) may additionally be trained with application information or data. In such examples, the process 900 may account for patterns related to an application or game, which may correspond to improved accuracy in the pose prediction. In some cases, the process 900 may implement the application information or data for training towards the end of the training process. For example, the process 900 may use the application information or data in a fully connected layer (e.g., the last one or two fully connected layers, such as fully connected layer 930) for input with high prediction error. That is, the application information or data may be indirectly incorporated into the process 900. Thus, models for different applications (e.g., games) may differ according to the content or pattern in the application.

In some cases, the deep learning based pose prediction model may directly incorporate application information or data for pose prediction. For example, the input 905 may include the information or data for pose prediction in addition to sensor statistics (e.g., a game application state and the IMU samples). The deep learning base pose prediction model may directly incorporate application information or data, indirectly incorporate application information or data, or both. In some cases, a system may use the outputs from the deep learning based pose prediction model (e.g., process 900) and application information or data as input to a linear regression model. The weights of the deep learning model may correspond to one or more learning techniques or models. In some examples, the system may use uncertainty to determine whether to incorporate application information or data. For example, if the uncertainty of the deep learning based pose prediction model (e.g., process 900) is high, then the system may use the application information or data (e.g., a game state) to predict head pose. If the uncertainty of the deep learning based pose prediction model is low, then the system may not use the application information or data in the model.

Figure 10:
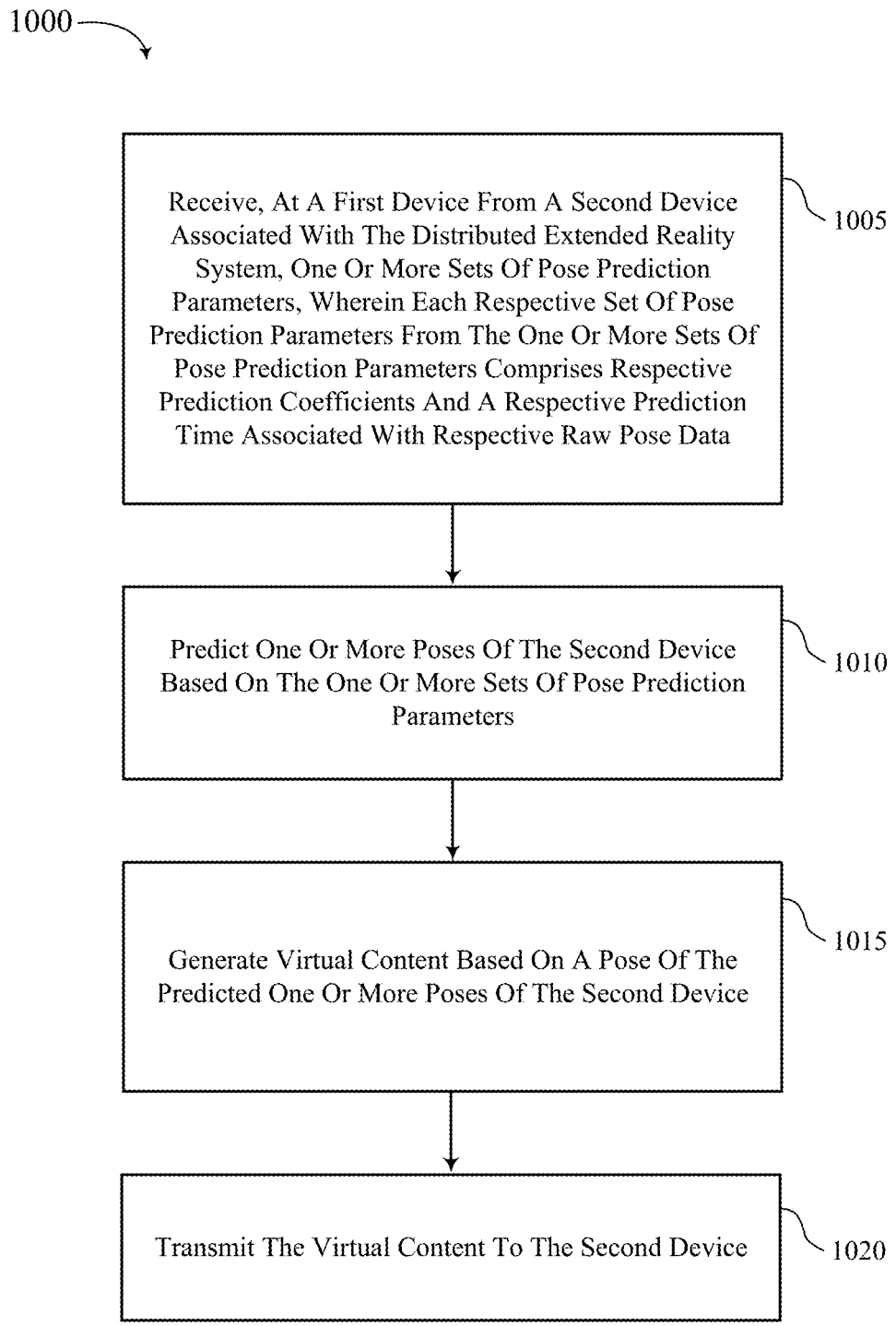
FIG. 10 is a flow diagram illustrating an example of a process of generating virtual content at a server device of a distributed extended reality system, according to aspects of the disclosure.

FIG. 10 illustrates an example of a process 1000 for generating virtual content at a first device of a distributed extended reality system. According to aspects described herein, the first device may include a server device (e.g., an edge or cloud-based server, a personal computer acting as a server device, a mobile device such as a mobile phone acting as a server device, an XR device acting as a server device, a network router, or other device acting as a server). Illustrative examples of the server device include the server device 410, the server device 610 of FIG. 6A, and the server device 710 of FIG. 7A. In some examples, a component (e.g., a chipset, processor, memory, any combination thereof, and/or other component may perform one or more of the operations of the process 1000).

At block 1005, the first device (or component thereof) may receive, from a second device associated with the distributed extended reality system, one or more sets of pose prediction parameters. Each respective set of pose prediction parameters from the one or more sets of pose prediction parameters may include respective prediction coefficients and a respective prediction time associated with respective raw pose data. In some aspects, the respective prediction coefficients may be generated (e.g., by the second device) using a machine learning system. In some cases, each respective set of pose prediction parameters from the one or more sets of pose prediction parameters may further include the respective raw pose data. In some examples, the respective raw pose data included in each respective set of pose prediction parameters is based on respective inertial measurement unit measurements associated with at least one sensor of the second device.

At block 1010, the first device (or component thereof) may predict one or more poses of the second device based on the one or more sets of pose prediction parameters. In some aspects, the predicted one or more poses of the second device include at least one future pose of the second device at a future time relative to a prediction time included in a set of pose prediction parameters from the one or more sets of pose prediction parameters. In some cases, the at least one future pose includes a relative head pose rotation at the future time and a relative head pose translation at the future time.

In some aspects, to predict the one or more poses of the second device based on the one or more sets of pose prediction parameters the first device (or component thereof) may model a relative pose of the second device as a polynomial of time over a prediction interval based at least in part on raw pose data and prediction coefficients included in a set of pose prediction parameters from the one or more sets of pose prediction parameters. The first device (or component thereof) may determine the at least one future pose of the second device based on the relative pose and the prediction time.

In some aspects, to predict the one or more poses of the second device, the first device (or component thereof) may predict a plurality of poses of the second device at a fixed interval of time (e.g., as described with respect to FIG. 6A and FIG. 6B). The first device (or component thereof) may predict each pose of the plurality of poses at the fixed interval of time based on at least one respective pose prediction parameter of the one or more sets of pose prediction parameters.

In some cases, the first device (or component thereof) may determine that a set of pose prediction parameters is received at an iteration of the fixed interval of time. The first device (or component thereof) may predict, for the iteration of the fixed interval of time, a pose of the second device based on the set of pose prediction parameters.

In some cases, the first device (or component thereof) may determine a set of pose prediction parameters is not received at an iteration of the fixed interval of time. The first device (or component thereof) may determine, based on determining the set of pose prediction parameters is not received at the iteration of the fixed interval of time, an updated prediction time based on a current time and a previous pose prediction time. The first device (or component thereof) may further predict, for the iteration of the fixed interval of time, a pose of the second device based on a previously received set of pose prediction parameters and the updated prediction time.

In some aspects, to predict the one or more poses of the second device, the first device (or component thereof) may determine the virtual content is to be generated and may predict the pose of the second device based on determining the virtual content is to be generated (e.g., as described with respect to FIG. 7A and FIG. 7B). For instance, the first device (or component thereof) may determine that the virtual content is to be generated based on a pose request from a rendering engine (e.g., the rendering engine 730 of FIG. 7A).

In some cases, the first device (or component thereof) may determine a set of pose prediction parameters is received at a first time associated with when the virtual content is to be generated. The first device (or component thereof) may determine, based on determining the set of pose prediction parameters is received at the first time, an updated prediction time based on a current time and a second time associated with when the set of pose prediction parameters is received. The first device (or component thereof) may further predict a pose of the second device based on the set of pose prediction parameters and the updated prediction time. In some examples, the first time is equal to the second time. In some examples, the first time is different from the second time.

In some cases, the first device (or component thereof) may determine a set of pose prediction parameters is not received at a time associated with when the virtual content is to be generated. The first device (or component thereof) may determine, based on determining the set of pose prediction parameters is not received at the time associated with when the virtual content is to be generated, an updated prediction time based on a current time and a previous pose prediction time. The first device (or component thereof) may further predict a pose of the second device based on a previously received set of pose prediction parameters and the updated prediction time.

In some aspects, the first device (or component thereof) may predict the one or more poses of the first device further based on a common clock reference. In some aspects, the first device (or component thereof) may predict the one or more poses of the first device further based on a predicted time at which at least one frame will be rendered.

At block 1015, the first device (or component thereof) may generate virtual content based on a pose of the predicted one or more poses of the second device, as described herein. At block 1020, the first device (or component thereof) may transmit the virtual content (e.g., as an encoded bitstream) to the second device.

Figure 11:
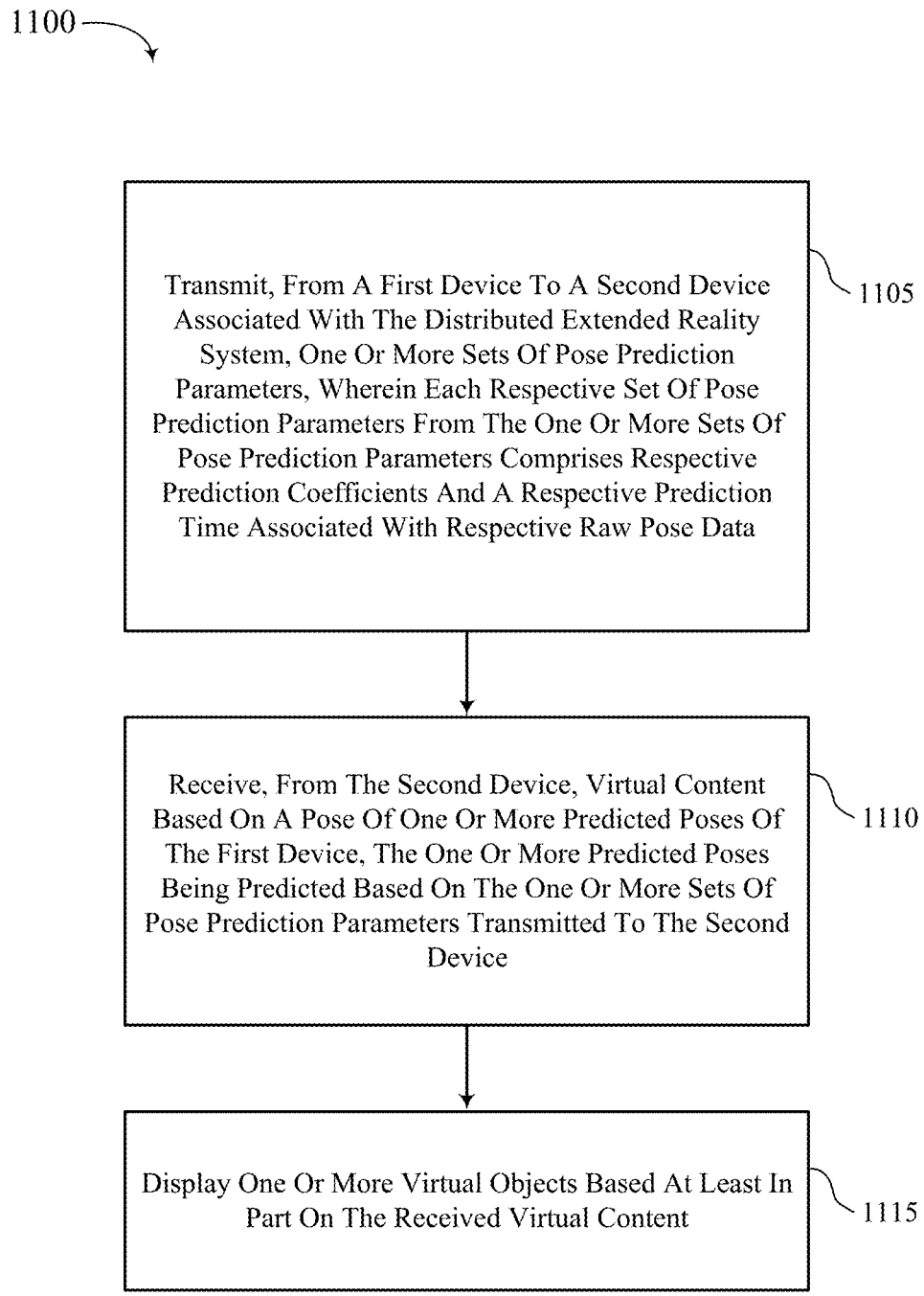
FIG. 11 is a flow diagram illustrating an example of a process of processing virtual data at a client device of a distributed extended reality system, according to aspects of the disclosure.

FIG. 11 illustrates an example of a process 1100 for processing virtual data at a first device of a distributed extended reality system. According to aspects described herein, the first device may include a client device (e.g., an extended reality device acting as a client device, a mobile device such as a mobile phone acting as a client device, a personal computer acting as a client device, or other device acting as a client device). Illustrative examples of the client device include the client device 405 of FIG. 4 and the client device 505 of FIG. 5. In some examples, a component (e.g., a chipset, processor, memory, any combination thereof, and/or other component may perform one or more of the operations of the process 1100).

At block 1105, the first device (or component thereof) may transmit, to a second device associated with the distributed extended reality system, one or more sets of pose prediction parameters. Each respective set of pose prediction parameters from the one or more sets of pose prediction parameters may include respective prediction coefficients and a respective prediction time associated with respective raw pose data. In some aspects, the first device may generate the prediction coefficients using a machine learning system. In some cases, each respective set of pose prediction parameters from the one or more sets of pose prediction parameters may further include the respective raw pose data. In some cases, the respective raw pose data included in each respective set of pose prediction parameters is based on respective inertial measurement unit measurements associated with at least one sensor of the first device. In some aspects, the one or more predicted poses of the first device include at least one future pose of the first device at a future time relative to a prediction time included in a set of pose prediction parameters from the one or more sets of pose prediction parameters. In some cases, the at least one future pose includes a relative head pose rotation at the future time and a relative head pose translation at the future time.

At block 1110, the first device (or component thereof) may receive, from the second device, virtual content (e.g., as an encoded bitstream) based on a pose of one or more predicted poses of the first device, the one or more predicted poses being predicted based on the one or more sets of pose prediction parameters transmitted to the second device. At block 1115, the first device (or component thereof) may display one or more virtual objects based at least in part on the received virtual content. In some examples, the first device (or component thereof) may determine a relative display position for the one or more virtual objects based at least in part on the at least one future pose of a user of the first device. The first device (or component thereof) may display the one or more virtual objects based at least in part on the relative display position.

In some cases, the device or apparatus configured to perform the operations of the process 1000 and/or the process 1100 may include a processor, microprocessor, microcomputer, or other component of a device that is configured to carry out the steps of the process 1000 and/or the process 1100. In some examples, such device or apparatus may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 1000 and/or the process 1100 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1000 and the process 1100 are illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 1000 and/or the process 1100) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Figure 12:
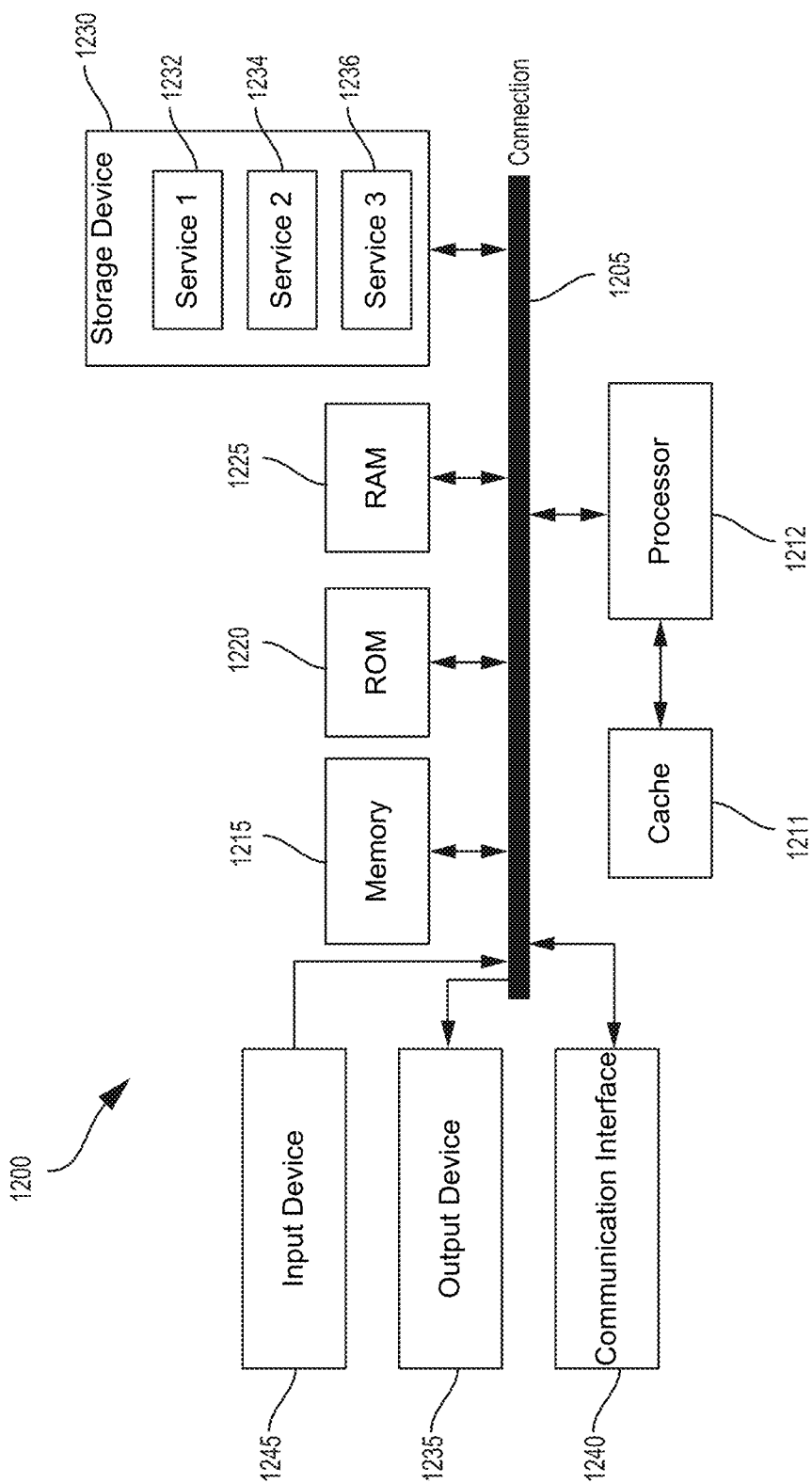
FIG. 12 is a diagram illustrating an example of a computing system, according to aspects of the disclosure.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some aspects, computing system 1200 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1200 includes at least one processing unit (CPU or processor) 1210 and connection 1205 that couples various system components including system memory 1215, such as read-only memory (ROM) 1220 and random-access memory (RAM) 1225 to processor 1210. Computing system 1200 can include a cache 1211 of high-speed memory connected directly with, in close proximity to, or integrated as part of processor 1210.

Processor 1210 can include any general-purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/long term evolution (LTE) cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1240 may also include one or more GNSS receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay, Mastercard and Visa (EMV) chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some aspects, a hardware service that performs a particular function can include the software component stored in a computer-readable medium in connection with the necessary hardware components, such as processor 1210, connection 1205, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method of generating virtual content at a first device of a distributed extended reality system, comprising: receiving, from a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; predicting one or more poses of the second device based on the one or more sets of pose prediction parameters; generating virtual content based on a pose of the predicted one or more poses of the first device; and transmitting the virtual content to the second device.

Aspect 2. The method of Aspect 1, wherein each respective set of pose prediction parameters from the one or more sets of pose prediction parameters further comprises the respective raw pose data.

Aspect 3. The method of Aspect 2, wherein the respective raw pose data included in each respective set of pose prediction parameters is based on respective inertial measurement unit measurements associated with at least one sensor of the second device.

Aspect 4. The method of any of Aspects 1 to 3, wherein the respective prediction coefficients are generated using a machine learning system.

Aspect 5. The method of any of Aspects 1 to 4, wherein the predicted one or more poses of the second device comprise at least one future pose of the second device at a future time relative to a prediction time included in a set of pose prediction parameters from the one or more sets of pose prediction parameters.

Aspect 6. The method of Aspect 5, wherein the at least one future pose comprises a relative head pose rotation at the future time and a relative head pose translation at the future time.

Aspect 7. The method of any of Aspects 4 or 5, wherein predicting the one or more poses of the second device based on the one or more sets of pose prediction parameters comprises: modeling a relative pose of the second device as a polynomial of time over a prediction interval based at least in part on raw pose data and prediction coefficients included in a set of pose prediction parameters from the one or more sets of pose prediction parameters; and determining the at least one future pose of the second device based on the relative pose and the prediction time.

Aspect 8. The method of any of Aspects 1 to 7, wherein predicting the one or more poses of the second device comprises: predicting a plurality of poses of the second device at a fixed interval of time, each pose of the plurality of poses being predicted at the fixed interval of time based on at least one respective pose prediction parameter of the one or more sets of pose prediction parameters.

Aspect 9. The method of Aspect 8, further comprising: determining a set of pose prediction parameters is received at an iteration of the fixed interval of time; and predicting, for the iteration of the fixed interval of time, a pose of the second device based on the set of pose prediction parameters.

Aspect 10. The method of Aspect 8, further comprising: determining a set of pose prediction parameters is not received at an iteration of the fixed interval of time; determining, based on determining the set of pose prediction parameters is not received at the iteration of the fixed interval of time, an updated prediction time based on a current time and a previous pose prediction time; and predicting, for the iteration of the fixed interval of time, a pose of the second device based on a previously received set of pose prediction parameters and the updated prediction time.

Aspect 11. The method of any of Aspects 1 to 10, wherein predicting the one or more poses of the second device comprises: determining the virtual content is to be generated; and predicting the pose of the second device based on determining the virtual content is to be generated.

Aspect 12. The method of Aspect 11, wherein determining the virtual content is to be generated is based on a pose request from a rendering engine.

Aspect 13. The method of any of Aspects 11 or 12, further comprising: determining a set of pose prediction parameters is received at a first time associated with when the virtual content is to be generated; determining, based on determining the set of pose prediction parameters is received at the first time, an updated prediction time based on a current time and a second time associated with when the set of pose prediction parameters is received; and predicting a pose of the second device based on the set of pose prediction parameters and the updated prediction time.

Aspect 14. The method of Aspect 13, wherein the first time is equal to the second time.

Aspect 15. The method of Aspect 13, wherein the first time is different from the second time.

Aspect 16. The method of any of Aspects 11 or 12, further comprising: determining a set of pose prediction parameters is not received at a time associated with when the virtual content is to be generated; determining, based on determining the set of pose prediction parameters is not received at the time associated with when the virtual content is to be generated, an updated prediction time based on a current time and a previous pose prediction time; and predicting a pose of the second device based on a previously received set of pose prediction parameters and the updated prediction time.

Aspect 17. The method of any of Aspects 1 to 16, further comprising: predicting the one or more poses of the first device further based on a common clock reference.

Aspect 18. The method of any of Aspects 1 to 17, further comprising: predicting the one or more poses of the first device further based on a predicted time at which at least one frame will be rendered.

Aspect 19. A first device for generating virtual content at a first device of a distributed extended reality system, the first device comprising: at least one memory; and at least one processor coupled to the at least one memory, the at least one processor configured to: receive, from a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; predict one or more poses of the second device based on the one or more sets of pose prediction parameters; generate virtual content based on a pose of the predicted one or more poses of the first device; and transmit the virtual content to the second device.

Aspect 20. The first device of Aspect 19, wherein each respective set of pose prediction parameters from the one or more sets of pose prediction parameters further comprises the respective raw pose data.

Aspect 21. The first device of Aspect 20, wherein the respective raw pose data included in each respective set of pose prediction parameters is based on respective inertial measurement unit measurements associated with at least one sensor of the second device.

Aspect 22. The first device of any of Aspects 19 to 21, wherein the respective prediction coefficients are generated using a machine learning system.

Aspect 23. The first device of any of Aspects 19 to 22, wherein the predicted one or more poses of the second device comprise at least one future pose of the second device at a future time relative to a prediction time included in a set of pose prediction parameters from the one or more sets of pose prediction parameters.

Aspect 24. The first device of Aspect 23, wherein the at least one future pose comprises a relative head pose rotation at the future time and a relative head pose translation at the future time.

Aspect 25. The first device of any of Aspects 23 or 24, wherein, to predict the one or more poses of the second device based on the one or more sets of pose prediction parameters, the at least one processor is configured to: model a relative pose of the second device as a polynomial of time over a prediction interval based at least in part on raw pose data and prediction coefficients included in a set of pose prediction parameters from the one or more sets of pose prediction parameters; and determine the at least one future pose of the second device based on the relative pose and the prediction time.

Aspect 26. The first device of any of Aspects 19 to 25, wherein, to predict the one or more poses of the second device, the at least one processor is configured to: predict a plurality of poses of the second device at a fixed interval of time, each pose of the plurality of poses being predicted at the fixed interval of time based on at least one respective pose prediction parameter of the one or more sets of pose prediction parameters.

Aspect 27. The first device of Aspect 26, wherein the at least one processor is configured to: determine a set of pose prediction parameters is received at an iteration of the fixed interval of time; and predict, for the iteration of the fixed interval of time, a pose of the second device based on the set of pose prediction parameters.

Aspect 28. The first device of Aspect 26, wherein the at least one processor is configured to: determine a set of pose prediction parameters is not received at an iteration of the fixed interval of time; determine, based on determining the set of pose prediction parameters is not received at the iteration of the fixed interval of time, an updated prediction time based on a current time and a previous pose prediction time; and predict, for the iteration of the fixed interval of time, a pose of the second device based on a previously received set of pose prediction parameters and the updated prediction time.

Aspect 29. The first device of any of Aspects 19 to 28, wherein, to predict the one or more poses of the second device, the at least one processor is configured to: determine the virtual content is to be generated; and predict the pose of the second device based on determining the virtual content is to be generated.

Aspect 30. The first device of Aspect 29, wherein the at least one processor is configured to determine the virtual content is to be generated based on a pose request from a rendering engine.

Aspect 31. The first device of any of Aspects 29 or 30, wherein the at least one processor is configured to: determine a set of pose prediction parameters is received at a first time associated with when the virtual content is to be generated; determine, based on determining the set of pose prediction parameters is received at the first time, an updated prediction time based on a current time and a second time associated with when the set of pose prediction parameters is received; and predict a pose of the second device based on the set of pose prediction parameters and the updated prediction time.

Aspect 32. The first device of Aspect 31, wherein the first time is equal to the second time.

Aspect 33. The first device of Aspect 31, wherein the first time is different from the second time.

Aspect 34. The first device of any of Aspects 29 or 30, wherein the at least one processor is configured to: determine a set of pose prediction parameters is not received at a time associated with when the virtual content is to be generated; determine, based on determining the set of pose prediction parameters is not received at the time associated with when the virtual content is to be generated, an updated prediction time based on a current time and a previous pose prediction time; and predict a pose of the second device based on a previously received set of pose prediction parameters and the updated prediction time.

Aspect 35. The first device of any of Aspects 19 to 34, wherein the at least one processor is configured to: predicting the one or more poses of the first device further based on a common clock reference.

Aspect 36. The first device of any of Aspects 19 to 35, wherein the at least one processor is configured to: predict the one or more poses of the first device further based on a predicted time at which at least one frame will be rendered.

Aspect 37. A first device for processing virtual data in a distributed extended reality system, the first device comprising: at least one memory; and at least one processor coupled to the at least one memory, the at least one processor configured to: transmit, to a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; receive, from the second device, virtual content based on a pose of one or more predicted poses of the first device, the one or more predicted poses being predicted based on the one or more sets of pose prediction parameters transmitted to the second device; and display one or more virtual objects based at least in part on the received virtual content.

Aspect 38. The first device of Aspect 37, wherein each respective set of pose prediction parameters from the one or more sets of pose prediction parameters further comprises the respective raw pose data.

Aspect 39. The first device of Aspect 38, wherein the respective raw pose data included in each respective set of pose prediction parameters is based on respective inertial measurement unit measurements associated with at least one sensor of the first device.

Aspect 40. The first device of any of Aspects 37 to 39, wherein the one or more predicted poses of the first device comprise at least one future pose of the first device at a future time relative to a prediction time included in a set of pose prediction parameters from the one or more sets of pose prediction parameters.

Aspect 41. The first device of Aspect 40, wherein the at least one future pose comprises a relative head pose rotation at the future time and a relative head pose translation at the future time.

Aspect 42. The first device of any of Aspects 40 or 41, wherein the at least one processor is configured to: determine a relative display position for the one or more virtual objects based at least in part on the at least one future pose of a user of the first device; and display the one or more virtual objects based at least in part on the relative display position.

Aspect 43. A method of processing virtual data at a first device of a distributed extended reality system, comprising: transmitting, to a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data; receiving, from the second device, virtual content based on a pose of one or more predicted poses of the first device, the one or more predicted poses being predicted based on the one or more sets of pose prediction parameters transmitted to the second device; and displaying one or more virtual objects based at least in part on the received virtual content.

Aspect 44. The method of Aspect 43, wherein each respective set of pose prediction parameters from the one or more sets of pose prediction parameters further comprises the respective raw pose data.

Aspect 45. The method of Aspect 44, wherein the respective raw pose data included in each respective set of pose prediction parameters is based on respective inertial measurement unit measurements associated with at least one sensor of the first device.

Aspect 46. The method of any of Aspects 43 to 45, wherein the one or more predicted poses of the first device comprise at least one future pose of the first device at a future time relative to a prediction time included in a set of pose prediction parameters from the one or more sets of pose prediction parameters.

Aspect 47. The method of Aspect 46, wherein the at least one future pose comprises a relative head pose rotation at the future time and a relative head pose translation at the future time.

Aspect 48. The method of any of Aspects 46 or 47, further comprising: determining a relative display position for the one or more virtual objects based at least in part on the at least one future pose of a user of the first device; and displaying the one or more virtual objects based at least in part on the relative display position.

Aspect 49. A non-transitory computer-readable medium is provided that has stored thereon instructions that, when executed by one or more processors, cause the one or more processors to perform operations according to any of Aspects 1 to 36.

Aspect 50. A first device for generating virtual content in a distributed extended reality system, the first device comprising one or more means for performing operations according to any of Aspects 1 to 36.

Aspect 51. A non-transitory computer-readable medium is provided that has stored thereon instructions that, when executed by one or more processors, cause the one or more processors to perform operations according to any of Aspects 37 to 48.

Aspect 52. A first device for generating virtual content in a distributed extended reality system, the first device comprising one or more means for performing operations according to any of Aspects 37 to 48.

What is claimed is:

1. A first device for generating virtual content in a distributed extended reality system, the first device comprising:
   at least one memory; and
   at least one processor coupled to the at least one memory, the at least one processor configured to:
      receive, from a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data;
      predict one or more poses of the second device based on the one or more sets of pose prediction parameters;
      generate virtual content based on a pose of the predicted one or more poses of the second device; and
      transmit the virtual content from the first device to the second device.

2. The first device of claim 1, wherein each respective set of pose prediction parameters from the one or more sets of pose prediction parameters further comprises the respective raw pose data.

3. The first device of claim 2, wherein the respective raw pose data included in each respective set of pose prediction parameters is based on respective inertial measurement unit measurements associated with at least one sensor of the second device.

4. The first device of claim 1, wherein the predicted one or more poses of the second device comprise at least one future pose of the second device at a future time relative to a prediction time included in a set of pose prediction parameters from the one or more sets of pose prediction parameters.

5. The first device of claim 4, wherein the at least one future pose comprises a relative head pose rotation at the future time and a relative head pose translation at the future time.

6. The first device of claim 4, wherein, to predict the one or more poses of the second device based on the one or more sets of pose prediction parameters, the at least one processor is configured to:
   model a relative pose of the second device as a polynomial of time over a prediction interval based at least in part on raw pose data and prediction coefficients included in a set of pose prediction parameters from the one or more sets of pose prediction parameters; and determine the at least one future pose of the second device based on the relative pose and the prediction time.

7. The first device of claim 1, wherein the respective prediction coefficients are generated using a machine learning system.

8. The first device of claim 1, wherein, to predict the one or more poses of the second device, the at least one processor is configured to:

predict a plurality of poses of the second device at a fixed interval of time, each pose of the plurality of poses being predicted at the fixed interval of time based on at least one respective pose prediction parameter of the one or more sets of pose prediction parameters.

9. The first device of claim 8, wherein the at least one processor is configured to:

determine a set of pose prediction parameters is received at an iteration of the fixed interval of time; and predict, for the iteration of the fixed interval of time, a pose of the second device based on the set of pose prediction parameters.

10. The first device of claim 8, wherein the at least one processor is configured to:

determine a set of pose prediction parameters is not received at an iteration of the fixed interval of time;

determine, based on determining the set of pose prediction parameters is not received at the iteration of the fixed interval of time, an updated prediction time based on a current time and a previous pose prediction time; and predict, for the iteration of the fixed interval of time, a pose of the second device based on a previously received set of pose prediction parameters and the updated prediction time.

11. The first device of claim 1, wherein, to predict the one or more poses of the second device, the at least one processor is configured to:

determine the virtual content is to be generated; and predict the pose of the second device based on determining the virtual content is to be generated.

12. The first device of claim 11, wherein the at least one processor is configured to determine the virtual content is to be generated based on a pose request from a rendering engine.

13. The first device of claim 11, wherein the at least one processor is configured to:

determine a set of pose prediction parameters is received at a first time associated with when the virtual content is to be generated;

determine, based on determining the set of pose prediction parameters is received at the first time, an updated prediction time based on a current time and a second time associated with when the set of pose prediction parameters is received; and predict a pose of the second device based on the set of pose prediction parameters and the updated prediction time.

14. The first device of claim 13, wherein the first time is equal to the second time.

15. The first device of claim 13, wherein the first time is different from the second time.

16. The first device of claim 11, wherein the at least one processor is configured to:

determine a set of pose prediction parameters is not received at a time associated with when the virtual content is to be generated;

determine, based on determining the set of pose prediction parameters is not received at the time associated with when the virtual content is to be generated, an updated prediction time based on a current time and a previous pose prediction time; and predict a pose of the second device based on a previously received set of pose prediction parameters and the updated prediction time.

17. The first device of claim 1, wherein the at least one processor is configured to:

predict the one or more poses of the first device further based on a common clock reference.

18. The first device of claim 1, wherein the at least one processor is configured to:

predict the one or more poses of the first device further based on a predicted time at which at least one frame will be rendered.

19. A first device for processing virtual data in a distributed extended reality system, the first device comprising:

at least one memory; and at least one processor coupled to the at least one memory, the at least one processor configured to:

transmit, to a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data;

receive, from the second device, virtual content based on a pose of one or more predicted poses of the first device, the one or more predicted poses being predicted by the second device based on the one or more sets of pose prediction parameters comprising the respective prediction coefficients and the respective prediction time associated with respective raw pose data transmitted to the second device; and display one or more virtual objects based at least in part on the received virtual content.

20. The first device of claim 19, wherein each respective set of pose prediction parameters from the one or more sets of pose prediction parameters further comprises the respective raw pose data.

21. The first device of claim 20, wherein the respective raw pose data included in each respective set of pose prediction parameters is based on respective inertial measurement unit measurements associated with at least one sensor of the first device.

22. The first device of claim 19, wherein the one or more predicted poses of the first device comprise at least one future pose of the first device at a future time relative to a prediction time included in a set of pose prediction parameters from the one or more sets of pose prediction parameters.

23. The first device of claim 22, wherein the at least one future pose comprises a relative head pose rotation at the future time and a relative head pose translation at the future time.

24. The first device of claim 22, wherein the at least one processor is configured to:

determine a relative display position for the one or more virtual objects based at least in part on the at least one future pose of a user of the first device; and display the one or more virtual objects based at least in part on the relative display position.

25. A method of processing virtual data at a first device of a distributed extended reality system, comprising:
- transmitting, to a second device associated with the distributed extended reality system, one or more sets of pose prediction parameters, wherein each respective set of pose prediction parameters from the one or more sets of pose prediction parameters comprises respective prediction coefficients and a respective prediction time associated with respective raw pose data;
- receiving, from the second device, virtual content based on a pose of one or more predicted poses of the first device, the one or more predicted poses being predicted by the second device based on the one or more sets of pose prediction parameters comprising the respective prediction coefficients and the respective prediction time associated with respective raw pose data transmitted to the second device; and
- displaying one or more virtual objects based at least in part on the received virtual content.

26. The method of claim 25, wherein each respective set of pose prediction parameters from the one or more sets of pose prediction parameters further comprises the respective raw pose data.

27. The method of claim 26, wherein the respective raw pose data included in each respective set of pose prediction parameters is based on respective inertial measurement unit measurements associated with at least one sensor of the first device.

28. The method of claim 25, wherein the one or more predicted poses of the first device comprise at least one future pose of the first device at a future time relative to a prediction time included in a set of pose prediction parameters from the one or more sets of pose prediction parameters.

29. The method of claim 28, wherein the at least one future pose comprises a relative head pose rotation at the future time and a relative head pose translation at the future time.

30. The method of claim 28, further comprising:
- determining a relative display position for the one or more virtual objects based at least in part on the at least one future pose of a user of the first device; and
- displaying the one or more virtual objects based at least in part on the relative display position.

* * * * *